(12) United States Patent
Signitzer

(10) Patent No.: US 9,439,407 B2
(45) Date of Patent: Sep. 13, 2016

(54) FISHING LURE WITH ACTION

(71) Applicant: Paul Allen Signitzer, Hervey Bay (AU)

(72) Inventor: Paul Allen Signitzer, Hervey Bay (AU)

( * ) Notice: Subject to any disclaimer, the term of this patent is extended or adjusted under 35 U.S.C. 154(b) by 80 days.

(21) Appl. No.: 13/928,390

(22) Filed: Jun. 27, 2013

(65) Prior Publication Data

US 2014/0000149 A1 Jan. 2, 2014

Related U.S. Application Data

(60) Provisional application No. 61/666,849, filed on Jun. 30, 2012.

(51) Int. Cl.
*A01K 85/16* (2006.01)
*A01K 85/00* (2006.01)
*A01K 85/01* (2006.01)

(52) U.S. Cl.
CPC .............. *A01K 85/00* (2013.01); *A01K 85/01* (2013.01); *A01K 85/16* (2013.01)

(58) Field of Classification Search
CPC ..... A01K 85/18; A01K 85/006; A01K 85/16
USPC ................ 43/42, 42.11, 42.13, 42.15, 42.22, 43/42.24, 42.26–42.28, 42.3, 42.36
See application file for complete search history.

(56) References Cited

U.S. PATENT DOCUMENTS

| | | | |
|---|---|---|---|
| 1,857,312 A * | 5/1932 | Kuehn | 43/42.02 |
| 2,209,161 A * | 7/1940 | Gunderson | 43/42.02 |
| 2,217,677 A * | 10/1940 | George | 43/42.02 |
| 2,221,381 A * | 11/1940 | Hosmer | 43/42.02 |
| 2,234,077 A * | 3/1941 | Hayley, Jr. | 43/42.02 |
| 2,491,846 A * | 12/1949 | Boekenoogen et al. | 43/42.3 |
| 2,534,482 A * | 12/1950 | Terhorst | 43/42.02 |
| 2,555,802 A * | 6/1951 | Martin | 43/26.2 |
| 2,607,151 A * | 8/1952 | Morris et al. | 43/26.2 |
| 2,636,316 A * | 4/1953 | Solovioff | 446/159 |
| 2,867,933 A * | 1/1959 | Stookey | 43/42.02 |
| 3,862,510 A * | 1/1975 | Peterson | 43/42.14 |
| 4,831,767 A * | 5/1989 | Pearce | 43/26.2 |
| 5,088,227 A * | 2/1992 | Toner et al. | 43/42.3 |
| 6,195,930 B1 * | 3/2001 | Sato | 43/42.3 |
| 6,546,663 B1 * | 4/2003 | Signitzer et al. | 43/4.5 |
| 8,621,776 B2 * | 1/2014 | Thomas | 43/42.31 |
| 2012/0005940 A1 * | 1/2012 | Thomas | 43/17.1 |

* cited by examiner

*Primary Examiner* — Christopher Harmon

(57) ABSTRACT

A fishing lure for attracting fish species, the fishing lure comprising a body, a first pivot on the body, a second pivot on the body and spaced from the first pivot. A bridge is between the first pivot and the second pivot, the bridge resiliently deformable from a neutral position to a forward position. A pivot arm extends from the first pivot and is operably coupled to the bridge so that deformation of the bridge towards the forward position causes the pivot arm to rotate in a first direction and resilient recovery of the bridge towards the neutral position causes the pivot arm to rotate in a second direction, opposite to the first direction, providing a simulated action of a limb. The body maybe formed to represent a bait species such as a frog, fish, bug, insect, crab, turtle, lizard, fly, cicada, dragonfly, squid, cuttlefish or imaginary creature. Preferably the fishing lure has a first pivot arm and a second pivot arm both operably coupled to the bridge and extended beyond the first pivot and second pivot respectively, to give simultaneous bilateral action.

19 Claims, 25 Drawing Sheets

FISHING LURE WITH ACTION

TECHNICAL FIELD

The present invention relates generally to fishing lures. While it is concerned with fishing lures of a type which simulate bait species, it is not so limited. The field relates to any form of lure which may be sufficiently attractive to induce a predatory fish to strike. The concept of the present disclosure may be used in many different types of lures.

BACKGROUND

In use, fishing lures are attached to a fishing line and one or more fish hooks are attached to the lure in such a way that a fish biting on the lure may be caught on the fish hook or hooks. Live frogs generally move forward through water by kicking their legs in a swimming action. Live fish generally move via the movement of fins and or tail in a swimming motion. Live bugs or insects generally move by flapping their wings. Crabs can move in water by kicking their rear legs or flippers. Turtles move by flapping their flippers. Lizards move by waving their legs and tail. Squid propel themselves by pulsing their arms and tentacles. Under distress, or as an escape response, these creatures commonly react with a rapid action of their respective appendages to propel themselves more quickly through the water. Repeated rapid actions generally result in rapid movement, sometimes in a somewhat erratic fashion, away from a perceived threat. The rapid action of the respective appendages results from extending and retracting of appendage segments, and the action creates a pressure wave in the water that may be recognized by predatory fish.

Lures have been developed which mimic, in a rudimentary fashion, the appearance or behaviour of some bait species. These lures may rely on passive movement of appendages due to relative movement of water or may have complex mechanical arrangements which are prone to malfunction and short working lives.

SUMMARY

In one form, although it need not be the only or indeed the broadest form, the invention may reside in a fishing lure for attracting fish species, the fishing lure comprising:
 a body;
 a first pivot on the body;
 a second pivot on the body and spaced from the first pivot;
 a bridge between the first pivot and the second pivot, the bridge resiliently deformable from a neutral position to a forward position;
 a pivot arm extending from the first pivot and operably coupled to the bridge;
 wherein:
 deformation of the bridge towards the forward position causes the pivot arm to rotate in a first direction bridge and resilient recovery of the bridge towards the neutral position causes the pivot arm to rotate in a second direction, opposite to the first direction.

The body may comprise two or more engaged sections. The body may be formed from any suitable material. A non limiting list of examples includes hard and soft plastics, metal, fiberglass or epoxy resins.

It is to be understood that a pivot being on the body includes a pivot located within the body. It may also be on a finger or other structure extending from the body. A pivot may be a pivot area or a pivot point.

The body may be formed to represent a bait species such as a frog, fish, bug, insect, crab, turtle, lizard, fly, cicada, dragonfly, squid, cuttlefish, imaginary creature or other similar species.

The first pivot and second pivot are preferably spaced on opposite sides to a longitudinal axis of the body. The first pivot and second pivot may be equilaterally spaced on opposite sides of the axis of the body.

The first pivot and second pivot may be positioned to notionally coordinate with respective left and right hips of a bait species such as a frog.

The bridge is preferably formed from a resilient elastomeric material. The bridge is preferably arched in a curve between the first pivot and second pivot. The neutral position is preferably towards a rear portion of the body with deformation occurring towards the forward position, although some lures may be adapted for backward travel through water in which case the positions may be reversed.

The pivot arm may be formed as an appendage of an animal such as a leg, a fin, a wing, a tail, a flipper, an arm, a tentacle or maybe formed as another type of fish attractant such as a feather, a flap, a flag, a worm, shaped metal, shaped plastic, a skirt, wounded tissue or any configuration intended to attract a predator.

Preferably the lure includes a first pivot arm and a second pivot arm both operably coupled to the bridge and extended beyond the first pivot and second pivot respectively. The pivot arms may be symmetrical features such as legs, fins, wings, flippers or similar.

The pivot arms may include interchangeable portions. The interchangeable portions are preferably terminal portions but may comprise substantial portions of the pivot arm itself. The interchangeable portions can be fitted to the pivot arms via frictional attachment, adhesive attachment, clips, bayonet fitment, screw or other attachment arrangements.

Deformation of the bridge preferably occurs due to application of force intermediate the pivots.

Deformation and recovery of the bridge may occur substantially co-planar with the first pivot and second pivot. Alternatively, at least some movement of the bridge may be outside a plane including the first pivot and second pivot and bridge at its neutral position. That is, the bridge may translate forward and backward and at least partially rotate upwards or downwards.

The fishing lure preferably includes a trigger area on the bridge, the trigger area adapted to receive a force applied directly or indirectly, such as through a fishing line or hook to cause deformation of the bridge from a neutral position. The trigger area may be a tunnel through the bridge to receive a fishing line or fish hook. Alternative configurations such as loops, channels, protrusions and other structures may also form the trigger area. In one embodiment, the trigger area is a tunnel centrally placed between the first pivot and second pivot and traversing the bridge from front to back. Preferably it is activated by forward tugging of the line and/or hook.

The trigger area or line may interact with an auxiliary hook or hooks positioned elsewhere on the lure. For example, hooks may be located on extremities of appendages such as legs with interconnecting lines to the bridge/main line or to the main line itself.

The trigger area may interact with another area of the lure. For example, a linking element may be attached from the trigger area to another appendage or armature such as a tail.

In operation, force applied to the trigger area by tugging of a fishing line causes reciprocating rotation of the pivot arm or arms. It may also activate the auxiliary hook or hooks. In one embodiment, that reciprocating motion simulates the movement of appendages of life-like form. It should be understood that imaginary creatures may also form the basis of shaping of the lure with a pivot arm or arms of any preferred structures.

The body may include a resistance enhancer for increasing resistance to forward movement of the fishing lure through water. This may act like a brake and cause potentiation of an application of force to the bridge. The resistance enhancer may comprise one or more surfaces that induce water resistance on acceleration. They may be in the form of an anatomical feature or features such as front legs, a concave cup or lip or bib.

The body may include one or more cavitities. The cavitities may be adapted to receive an insert such as a weight, a scent pellet, a flotation chamber, or a rattle or rattle chamber. The inserts may be permanently fixed or removable due to a friction fit, a slide and rail engagement, or other retention arrangement.

The body may include one or more passages for a fishing line to pass through, prior to operative attachment to the trigger area.

The pivot arms may include further extensions, particularly when formed as limbs of an animal. Further extensions may be foot paddles formed on terminal portions of legs. Other extensions such as tendrils, soft plastic extensions, feathers, skirts and similar may also be used. The lure may include a concave forward projection.

The lure may further include a separate anterior component for insertion into a forward portion of the body. The separate component may fit via friction and/or adhesive fit. The separate component may be adapted to vary buoyancy and can include an air pocket, a buoyant material or chamber or a cavity, slide or rail for insertion of a weight or flavour release chamber.

The lure may further include a guard positioned at or around a hook on the lure, the guard dimensioned to shield, at least in part, a corresponding gape and point of a hook. In operation the guard shields the corresponding gape when it trails the guard. A guard may be provided for each hook gape on the lure. The guard can be an integral part of the lure, permanently fixed or removable due to a friction fit, adhesive fit, or other retention arrangement. The guard may be substantially wing or fin shaped.

BRIEF DESCRIPTION OF THE DRAWINGS

Features of exemplary embodiments of the invention are described hereinafter, by way of example only, with reference to the accompanying drawings in which.

DETAILED DESCRIPTION OF DRAWINGS

Figure 1:
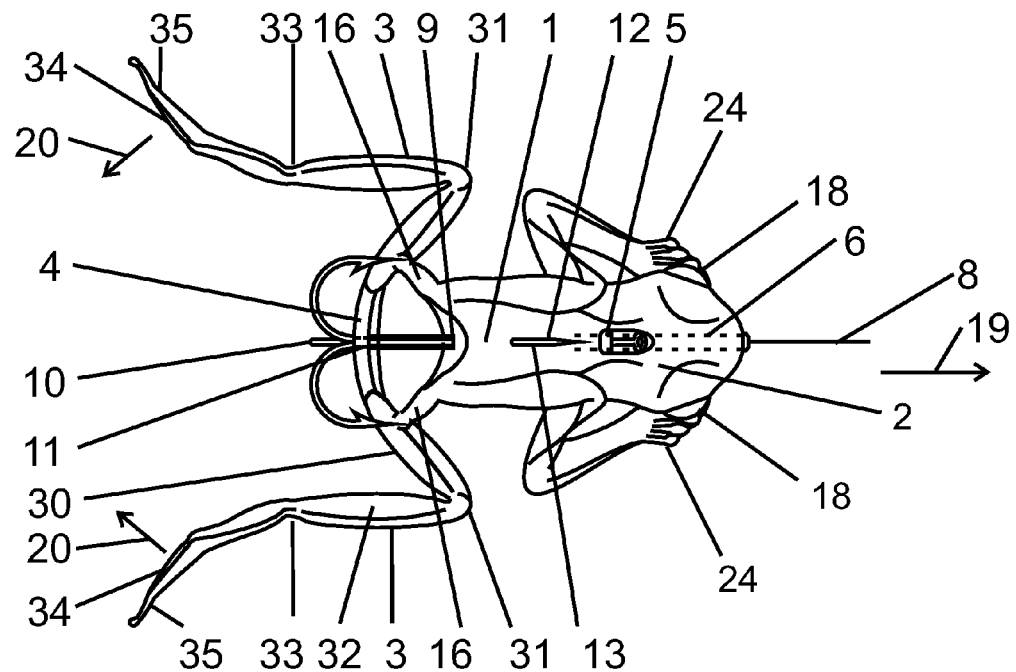
FIG. 1 is a plan view of a fishing lure according to a first embodiment of the invention in a neutral position ("rest position")

Hereinafter, unless otherwise indicated, like numerals designate like elements or features of the described embodiments.

Referring generally to FIGS. 1 to 32, a fishing lure 1 is made in the form of a frog. The fishing lure 1 includes a body 2 which simulates the head and main torso portion of the frog 1, pivots in the form, pivot points 16 and legs 3 (which simulates the rear leg portions of the frog). The pivots 16 are connected by a bridge 4. An upper passage 5 and a front passage 6 extend through the body 2. The front passage 6 opens at one end centrally of the forward body 2 and the upper passage 5 opens about midway along the top of the body 2. Both passages open at their other ends near the centre underbody 7.

Figure 2:
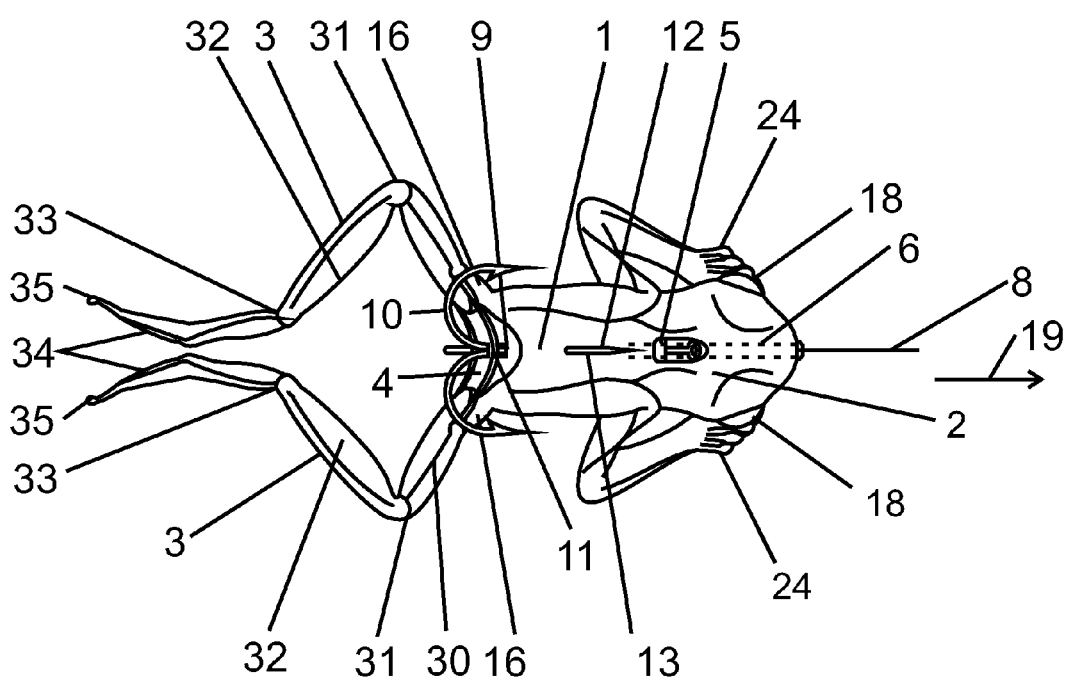
FIG. 2 is a plan view of a fishing lure according to the embodiment of FIG. 1 of the invention with a bridge in a forward position ("flexed position")

In use, either a fishing line 8 or a prerigged leader 143 with ring 142 attachment connected to the fishing line 8, passes through either the upper passage 5 or the front passage 6 to the centre underbody 7. The underside of the region 7 is hollowed out to permit the line to run through the forward portion. A main hook 10 in the form of a treble hook, double hook or single hook is inserted through a bridge passage 11 in the bridge 4, passing through the rear body passage 9 of the body 2 so that the main hook 10 can be connected to the fishing line 8. In use, when the line 8 is pulled in the direction 19, the bridge 4 is pulled forward pivoting about pivots 16 so that the gap between the bridge 4 and the rear of the body 2 closes in distance. This pivoting motion causes the legs 3 to move or rotate backwards as shown in FIG. 2 where the legs 3 have moved to a flexed position. After the line 8 is pulled, the bridge 4 returns to its neutral position simulating through the sequence of steps, the kicking action of a frog.

Either the fishing line 8 or a prerigged leader 143 with ring 142 attachment connected to the fishing line 8 can be run through the eye of the optional hook 12 which is held in its preferred posture by a hook retaining edge 13 before tying off to the main hook 10. The line 8 can also run through the eye of the optional hook 14 which is held in its preferred posture by a hook retaining edge 15 before tying off to the main hook 10.

The lure 1 also has front legs 24 for stabilising the lure during movement through the water. The front legs 24 project forward and angularly outward and are angled slightly downwardly so as to maintain the lure in the normal upright position in which a frog would normally travel through the water. The front legs 24 also serve to enhance resistance to forward movement of the lure, this resistance being accentuated when the lure is sharply pulled forward. The shape of the front legs 24 is such as to induce an inertial resistance from the water to thereby potentiate the resilient deformation of the bridge 4 as the line 8 is pulled. In the absence of an induced inertial resistance of the water to the movement of the lure 1, the leg kicking action may be harder, although still possible, to generate as the entire lure 1 may have the tendency to move forward through the water more easily in response to a sharp pull on the line 8. Advantageously, the front legs 24 may be enlarged or reduced when manufactured so as to generate greater or lesser resistance from the water, to forward movement of the lure 1 as required for a specific lure.

Simulated eyes 18 are located on the side towards the front of the forward body portion 2 and are coloured and shaped to enhance the simulation effect.

The space between the bridge 4 and the rear of the body 2 allows for a greater degree of rotation of the legs 3 relative to the forward portion 2 about the pivots 16, than would be provided by a solid and continuous flexure region while substantially maintaining the general appearance of a frog. The closure of the bridge 4 and the rear of the body 2 is illustrated in the transition of the lure from the position shown in FIGS. 1 and 3 to that shown in FIGS. 2 and 4 respectively when the line 8 is jerked.

Figure 5:
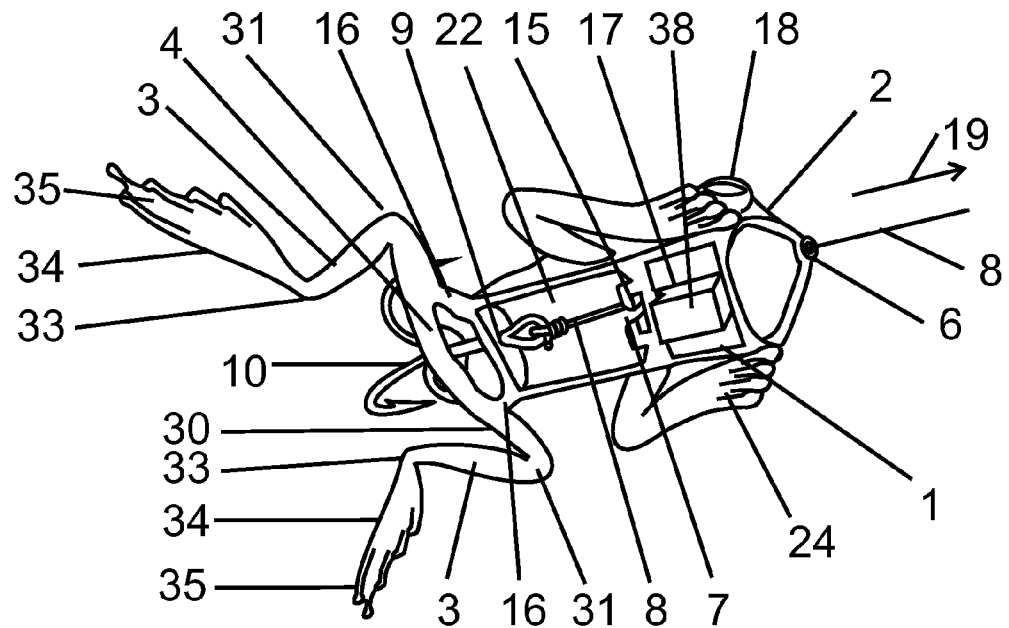
FIG. 5 is a perspective view of a fishing lure according the embodiment of the FIG. 1 in a rest position, viewed from the underside with hooks in place in the lure.

As shown in FIG. 5, a weight 38 can be inserted in a cavity 17 in the forward portion 2 to add weight to the lure 1. Alternatively, a scent pellet may be inserted in cavity 17 for providing a water soluble scent simulative of the frog. Alternatively, a rattle pellet (having an internal granule for making a rattling sound in response to movement of the lure) may be inserted in the cavity 17 for making a noise to attract a fish.

The main hook 10, optional hooks 12 and 14, and weight 38 are fitted to the lure 1 by means of an interference fit, or alternatively may be fixed in place in the lure by means of a suitable adhesive. The weight 38 may be removed manually if desired by deforming the lure body so as to neutralise the effect of the interference fit and pushing the weight 38 from the weight cavity 17.

The legs 3 as shown in FIGS. 1-6 are segmented into the thigh (upper legs) 30, knee 31, calf 32, ankle 33, sole 34 with webbed feet 35 to simulate to some extent the anatomical elements of an actual frog's rear legs. The legs are made from an elastomeric material with reflex capabilities between neutral and flexed positions such that the ankle 33, knee 31 and hip pivot 16 joints allow the other leg elements to flex about each of these joints respectively when the lure is pulled through the water.

Figure 10:
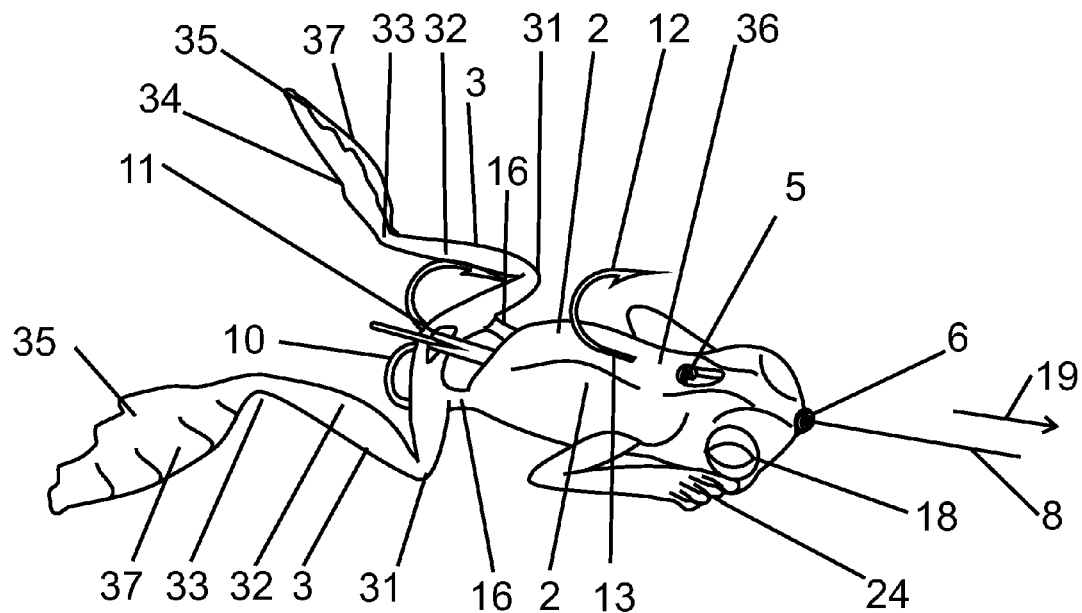
FIG. 10 is a perspective view of a fishing lure according to a second embodiment in a rest position, viewed from above with hooks in place in the lure and having foot paddles

Referring to FIG. 10, an alternative fishing lure 36 is provided with a similar arrangement to the fishing lure 1 shown in FIGS. 1 to 9 and includes foot paddles 37 at the rear of the legs 3. If the line is pulled through the water with continuous or rapid speed using fishing apparatus, the foot paddles 37 create inertial resistance against the water and create a fluttering vibration in the water that releases pressure waves that can attract fish to strike the lure 36.

Figure 11:
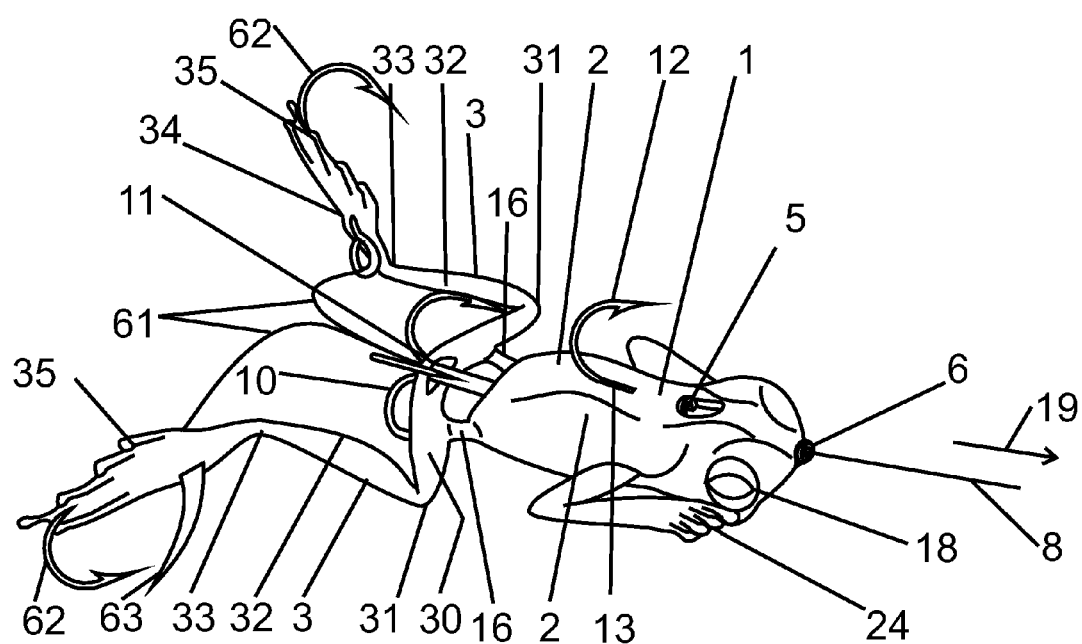
FIG. 11 is a perspective view of a fishing lure according to a third embodiment in a rest position viewed from above with extension hooks and guard in place in the lure

Referring to FIG. 11, an alternative hook arrangement includes hooks 62 which are engaged on the webbed feet 35 at an extension away from the main hook 10. The hooks 62 can be linked to the main line 8, main hook 10 or bridge 4 via a wire, line or cord 61. A guard 63 can be included in the arrangement to minimise the likelihood of the additional hooks 62 from becoming entangled on underwater structures or weed.

Figure 6:
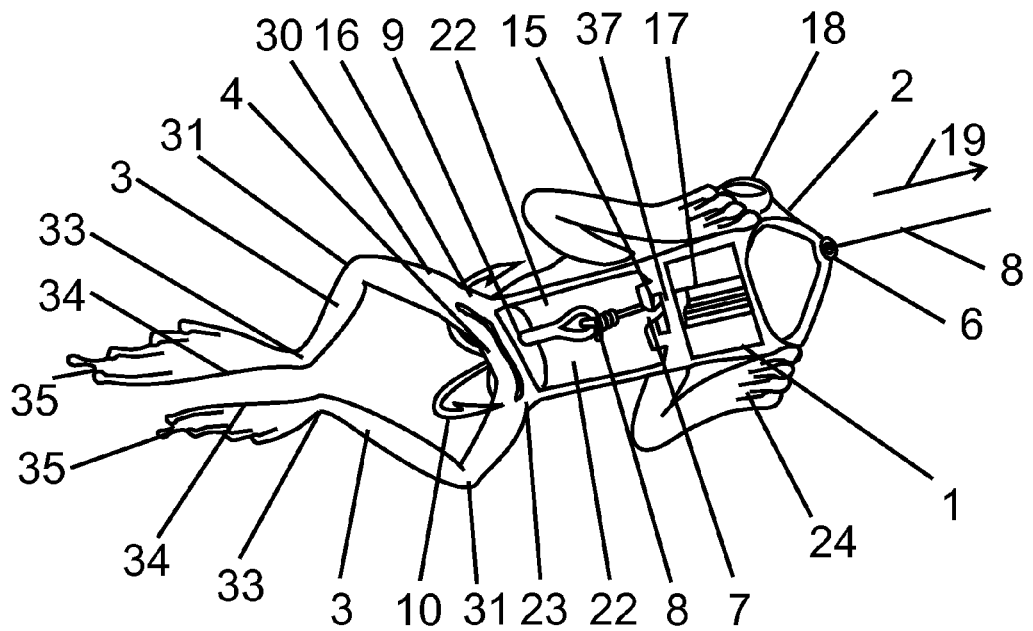
FIG. 6 is a perspective view of a fishing lure according to the first embodiment of lure in a flexed position, viewed from the underside with hooks in place in the lure.
Figure 7:
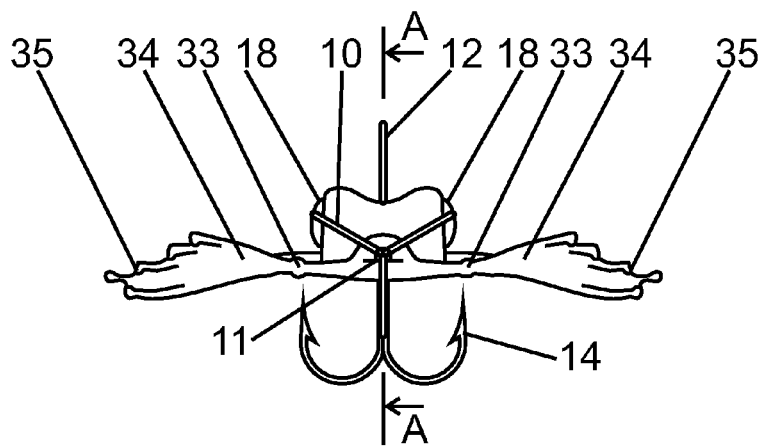
FIG. 7 is a rear view of a fishing lure according to the first embodiment of the lure in a neutral position, with hooks in place in the lure.
Figure 8:
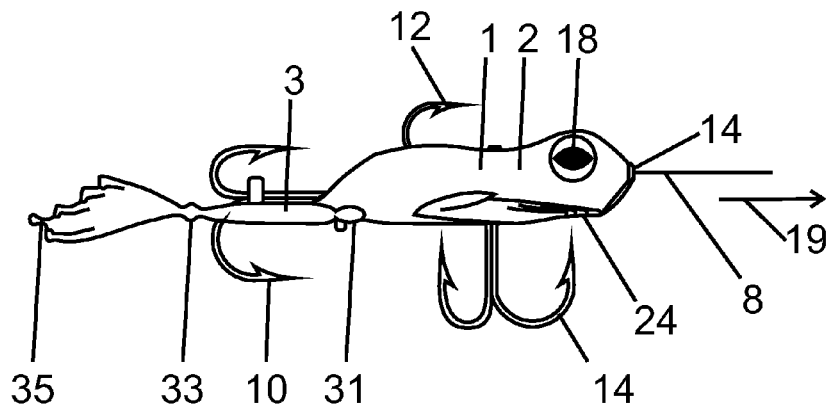
FIG. 8 is a side view of a fishing lure according to the first embodiment of the lure in a rest position; with hooks in place in the lure.
Figure 9:
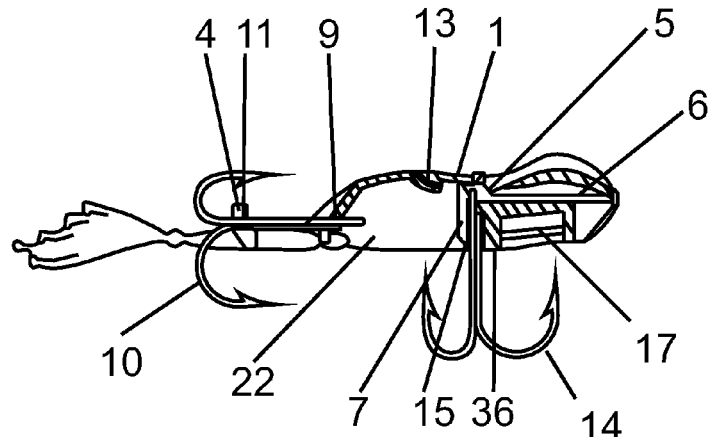
FIG. 9 shows a sectional view on line A-A of FIG. 7

Jerking, tugging or flicking the fishing line 8 causes a temporary tension force on the fishing line in the direction of the arrows 19 shown in FIG. 1. This temporary tension will cause a pivoting of the legs 3 in the direction of the arrow 20 shown in FIG. 1, about the pivots 16 actuated from the bridge 4 when the line 8 is pulled. Tension or tugging on the fishing line, when effected, is transmitted to the main hook 10 which is located fixedly or pulls against the bridge passage 11. The main hook 10 continues slidably through the rear body passage 9 with the eye of the main hook 10 being exposed in the hollowed out underside 22 of the body 2. The hollowed out underside 22 has sufficient space for the main hook 10 to slide forward and backwards without catching on the lure 1 as shown in FIGS. 5 and 6.

Figure 3:
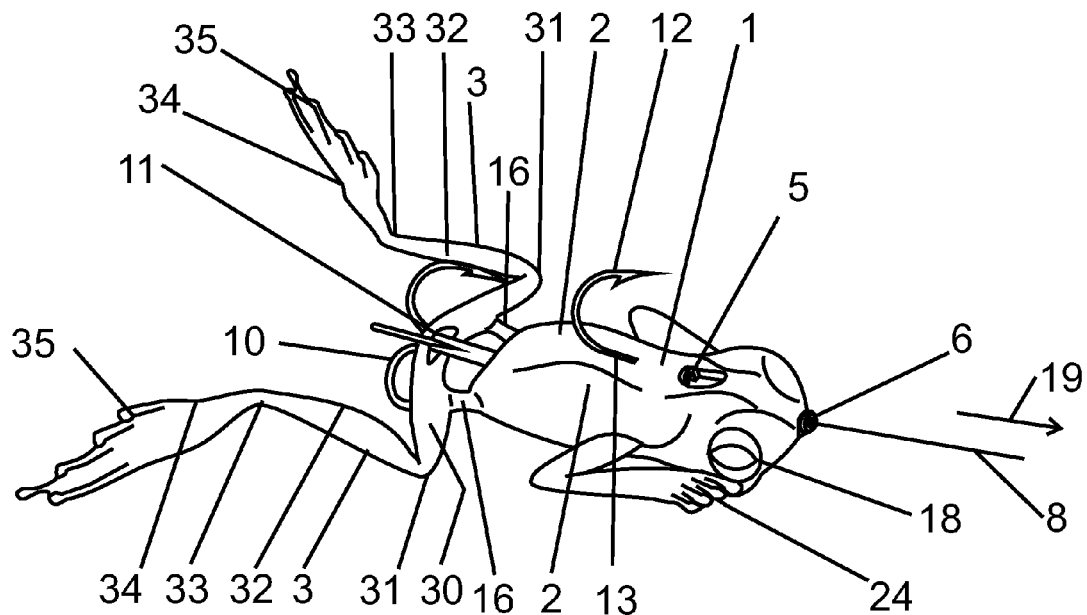
FIG. 3 is a perspective view of a fishing lure according to the embodiment of FIG. 1 in a rest position viewed from above with hooks in place in the lure.
Figure 4:
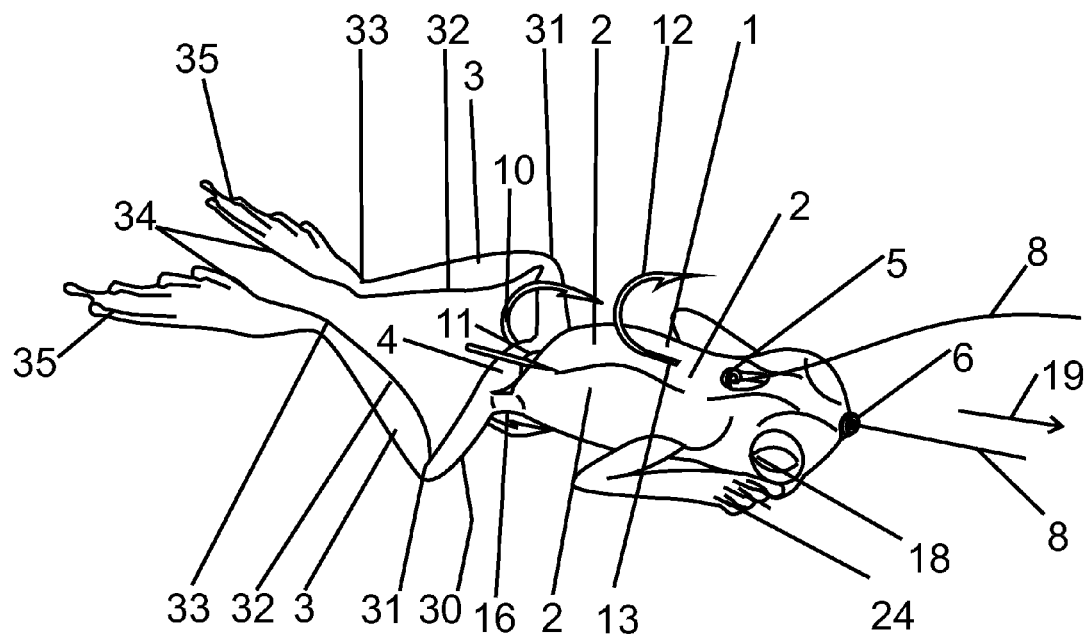
FIG. 4 is a perspective view of a fishing lure according to the embodiment of FIG. 1 in a flexed position, viewed from above with hooks in place in the lure.

FIGS. 1 to 6 illustrate the flexion of the bridge 4 during rotational movement of the legs 3 relative to the body 2. The legs 3 are connected via thin dimensioned pivots 16 connected to the rear of the body 2 and equilaterally spaced on opposite sides of the axis of the body. These collection of elements; legs 3, bridge 4, pivots 16, and body 2 can be integrally moulded from one elastomeric material or be a combination of separate pieces that move relative to each other. The relatively thin dimension of the pivots 16, and bridge 4 advantageously provides for ease of rotational flexion and are biased to return to the neutral position as shown in FIGS. 1 and 3.

Figure 12:
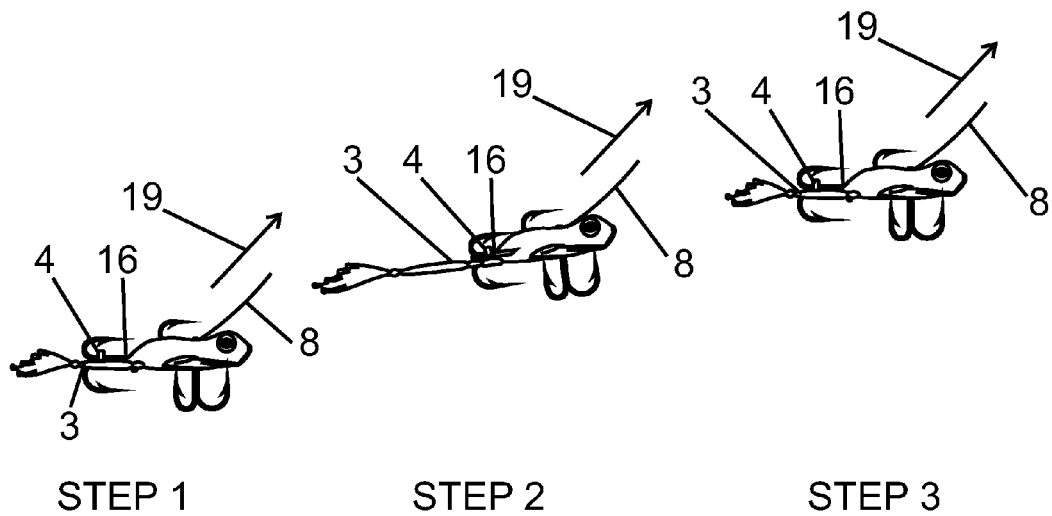
FIG. 12 is a series of side views representing 3 steps that illustrate the movement of a fishing lure of the present invention in the water when pulled forward and upwards with a fishing line.

FIG. 12, shown as steps 1 to 3, illustrates the sequential positions of the lure 1 in water in response to a jerk on the fishing line 8 when it is passed through the upper passage 5. Step 1 shows the neutral position. Steps 2 shows the lure 1 moving forward as the fishing line 8 is tensioned or tugged as shown in direction arrow 19 and the flexing and rotational movement of the elements 16, 4 and 3 to the flexed position and imparting a force or pressure wave on the water in direction 20. Coupled with the forward jerk on the line 8 in the direction indicated by arrow 19, the movement may give a resultant movement which is somewhat forward and upward. The front legs 24 create inertial resistance against the water to forward and upward movement. Step 3 shows the reflex flexure of the elements 16, 4 and 3 returning to the neutral position once the tension on the line 8 is released and the lure tends to come to rest or drift downwardly in the water depending on the weighting of the lure 1.

Figure 13:
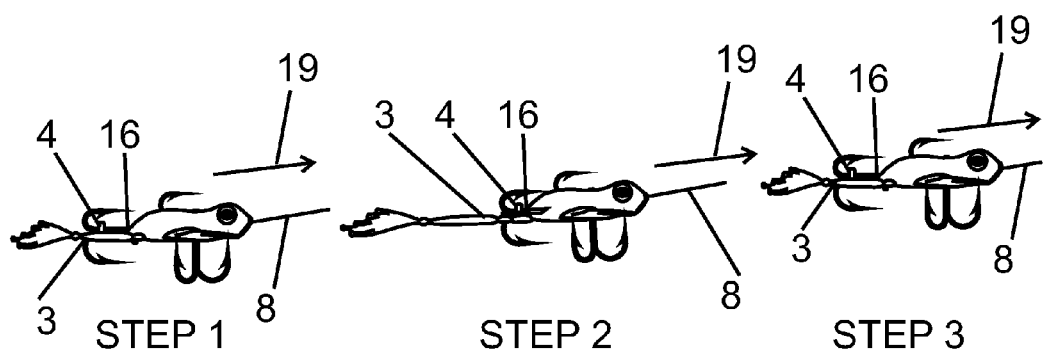
FIG. 13 is a series of side views representing 3 steps that illustrate the movement of the fishing lure of FIG. 12 in the water when pulled forward with a fishing line.
Figure 14:
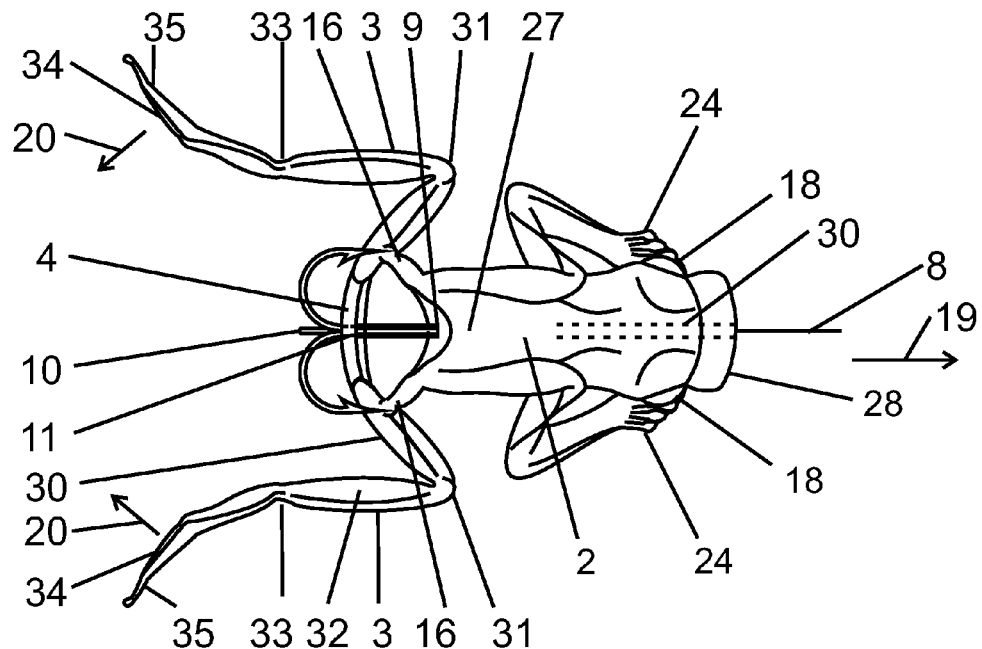
FIG. 14 is a plan view of a fishing lure according to a fourth embodiment in a rest position, having a concave mouth/nose area
Figure 15:
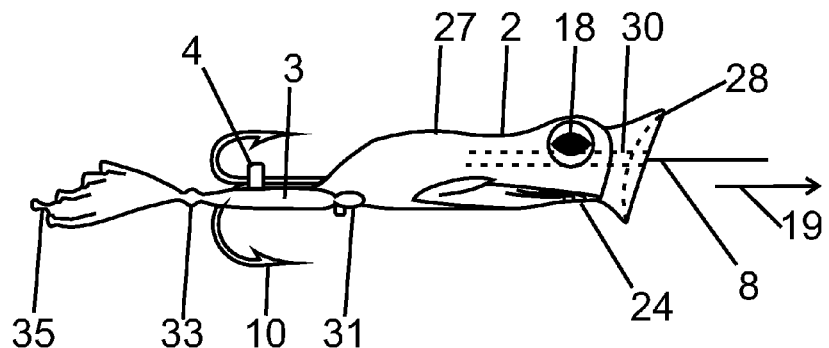
FIG. 15 is a side view of a fishing lure according to the embodiment of FIG. 14 in a rest position; having a concave mouth/nose area
Figure 16:
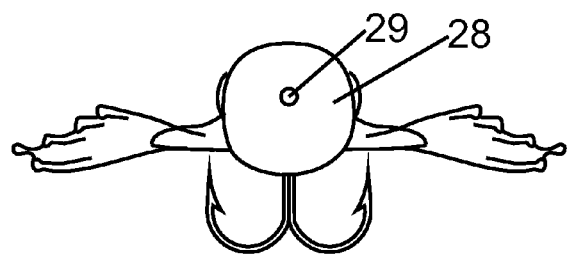
FIG. 16 is a front view of a fishing lure according to the embodiment of FIG. 14 in a rest position; having a concave mouth/nose area
Figure 17:
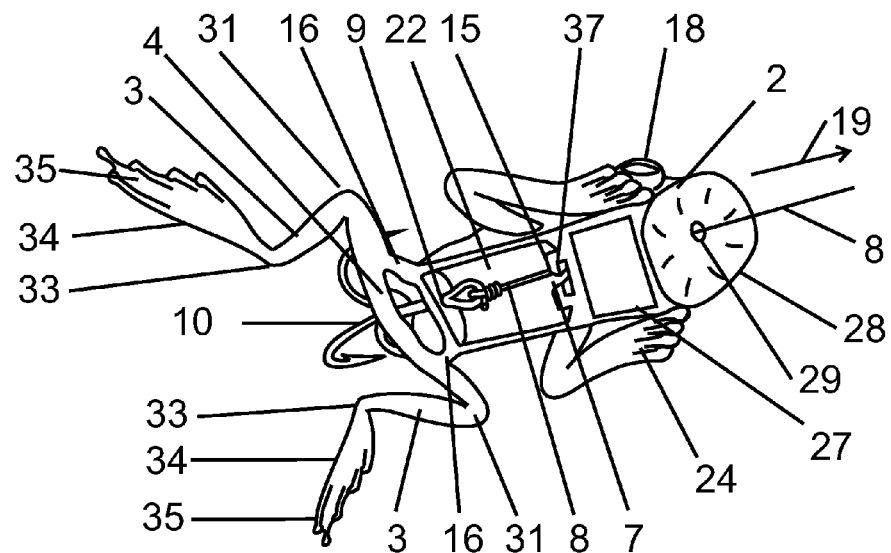
FIG. 17 is a perspective view of a fishing lure according to the embodiment of FIG. 14 in a rest position; viewed from the underside with hooks in place in the lure, having a concave mouth/nose area
Figure 18:
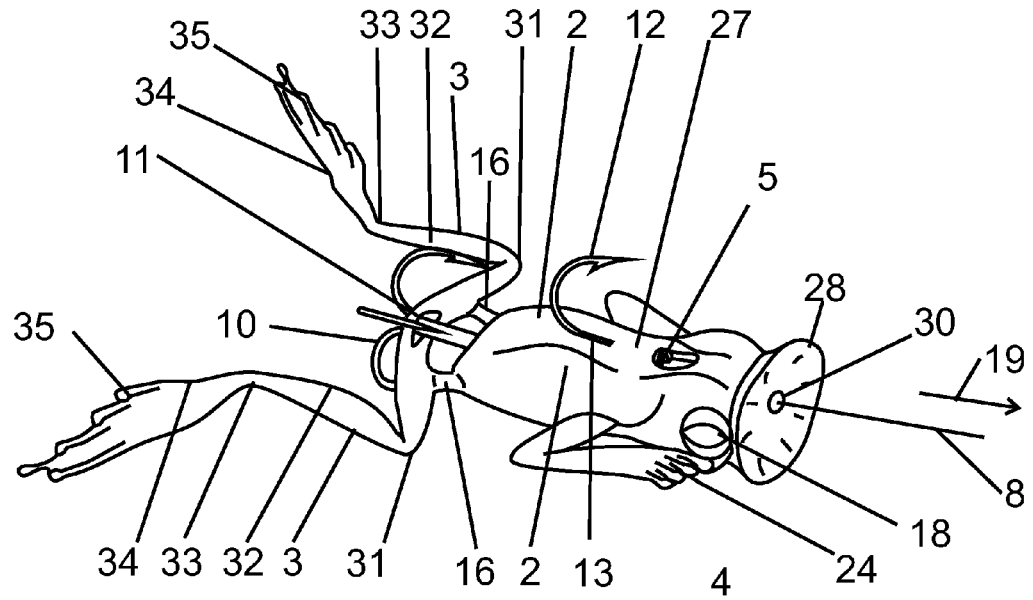
FIG. 18 is a perspective view of a fishing lure according to the embodiment of FIG. 14 in a rest position, viewed from above with hooks in place in the lure; having a concave mouth/nose area

FIG. 13, shown as steps 1 to 3, illustrates the sequential positions of the lure 1 in water in response to a jerk on the fishing line 8 when it is passed through the front passage 6. Step 1 shows the neutral position. Steps 2 shows the lure 1 moving forward as the fishing line 8 is tensioned or tugged as shown in direction arrow 19 and the flexing and rotational movement of the elements 16, 4 and 3 to the flexed position and imparting a force or pressure wave on the water in direction 20. Coupled with the forward jerk on the line 8 in the direction indicated by arrow 19, the movement may give a resultant movement which is somewhat forward. The front legs 24 create inertial resistance against the water to forward and upward movement. Step 3 shows the reflex flexure of the elements 16, 4 and 3 returning to the neutral position once the tension on the line 8 is released and the lure tends to come to rest or drift downwardly in the water depending on the weighting of the lure 1.

In another embodiment of the invention, the optional hook 14 is threaded on the line 8 but is slotted into place in the underside hollow of the body 2 in a slot defined between the rear of the weight retainer 36 and a hook locator 37. The hook locator 37 is connected to the rear of the weight retainer 36 on the under side thereof in the region of the outlet of the upper passage 6 and front passage 5 and has a slot or gap therein for allowing the line 8 to pass or be threaded there through. The slot defined between the rear of the weight retainer 36 and the hook locator 37 serves to retain the optional hook 14 in place while the line 8 may be threaded through an eye of the hook 14 for retention of the hook 14. This arrangement for securing the optional hook 14 advantageously serves to keep the hook 14 from sliding down the line 8 toward the main hook 10 and interfering with the leg kicking action when the bridge 4 is pulled forward towards the body 2 causing the legs 3 to rotate in a manner that simulates a frog kicking action. Advantageously, the hook 14 may be separated from the hook locator 37 if a fish becomes hooked on the hook 14. This allows for easier removal of the hook 14 from the fish once the fish is landed.

Referring to FIGS. 14 to 20, an alternative fishing lure 27 is provided with a similar arrangement to the fishing lure 1 shown in FIGS. 1 to 9 and includes a concave forward projection 28. A fishing line 8 or a prerigged leader 143 with ring 142 attachment connected to the fishing line 8 is threaded through a forward opening 29 through an internal passage 30 before tying off to the main hook 10. In operation, when the line is pulled by the operator, the lure can push water, causing a turbulent or splashing effect when fished on the water surface in combination with the kicking leg action.

In each of the lures depicted in the drawings, the lure may be provided with only one of the upper and front passages depending on the specific fishing application and environment.

The illustrated embodiments of the lure relate to simulated frogs generally of a frog shape. The form and configuration of the lure is at least somewhat tailored to optimise the simulation of the particular frog. Advantageously, the injection moulding process by which the lures are formed allows for these features to be easily tailored as desired during the manufacturing process.

Figure 19:
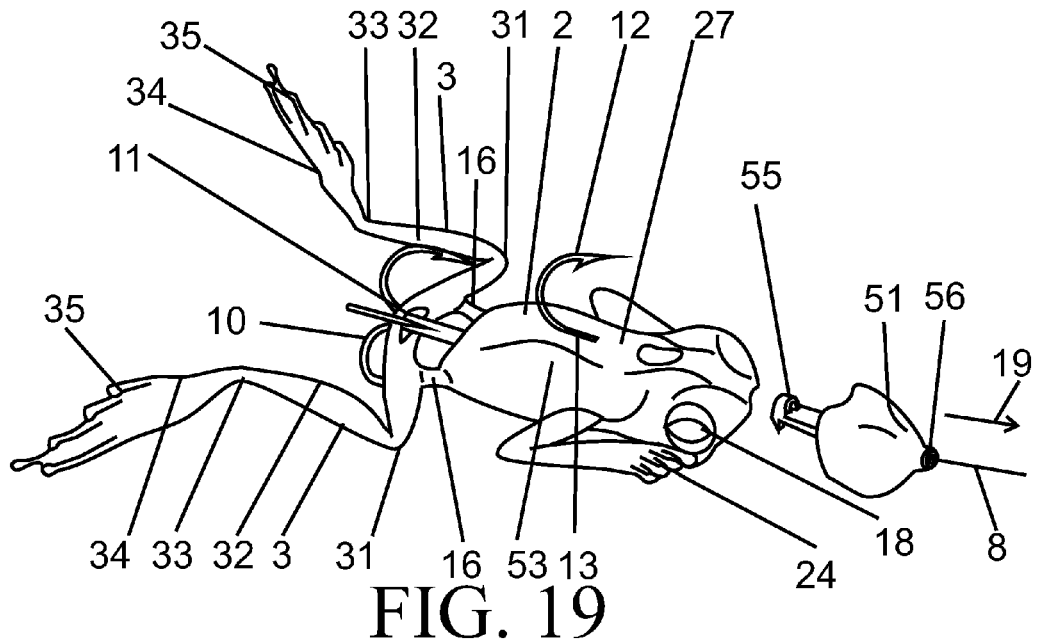
FIG. 19 is a perspective view of a fishing lure according to a fifth embodiment of the invention in a rest position, viewed from the upperside with hooks in place in the lure and having a second component that fits relative to the fishing lure via a friction and or adhesive fit and can include channels for the line to pass through and buoyancy.
Figure 20:
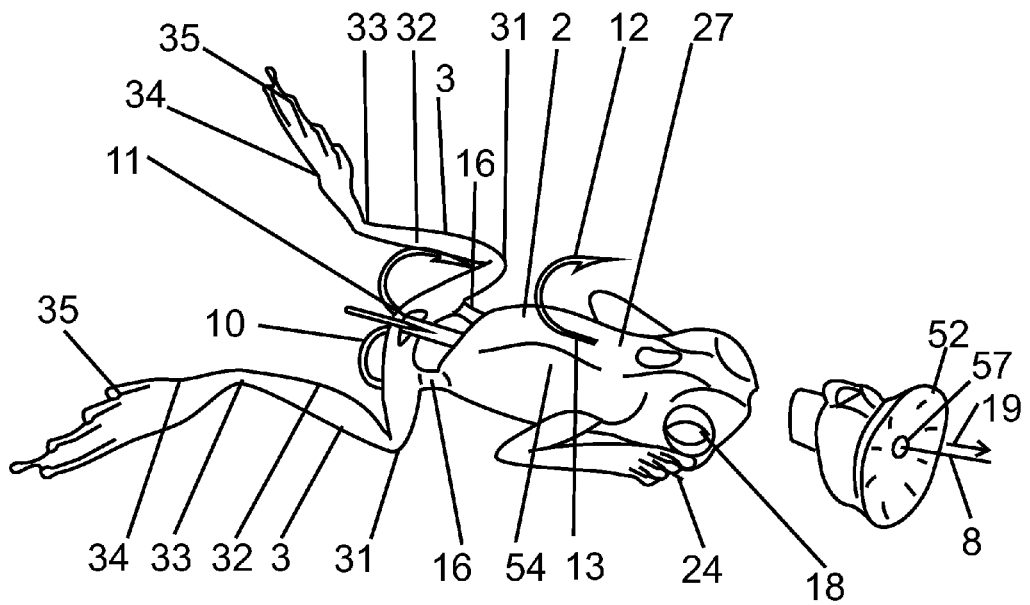
FIG. 20 is a perspective view of a fishing lure according to the embodiment of FIG. 19 the invention in a rest position, viewed from above with hooks in place in the lure and having a second component that fits relative to the fishing lure via a friction and or adhesive fit and includes channels for the line to pass through and a concave mouth/nose area and buoyancy.
Figure 20A:
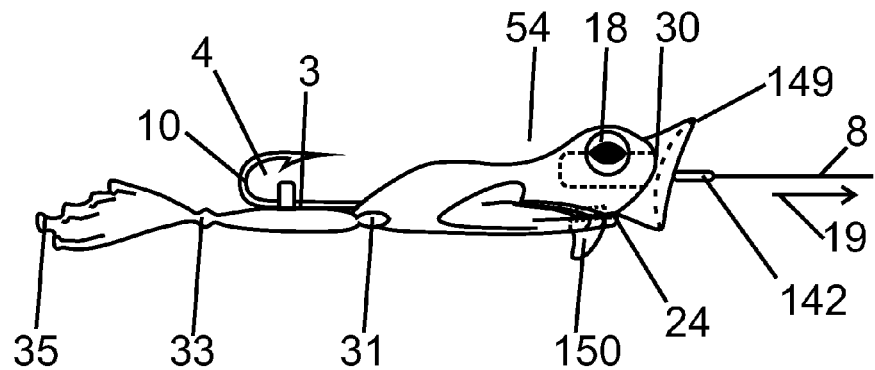
FIGS. 20a-f are side, bottom, top and front views of the embodiment of FIG. 20 the invention in the rest position, viewed with hook in place in the lure, having a second component that fits relative to the fishing lure via a friction and or adhesive fit and can include channels for the line or prerigged leader to pass through and a concave mouth/nose area, buoyancy and weighting.
Figure 20B:
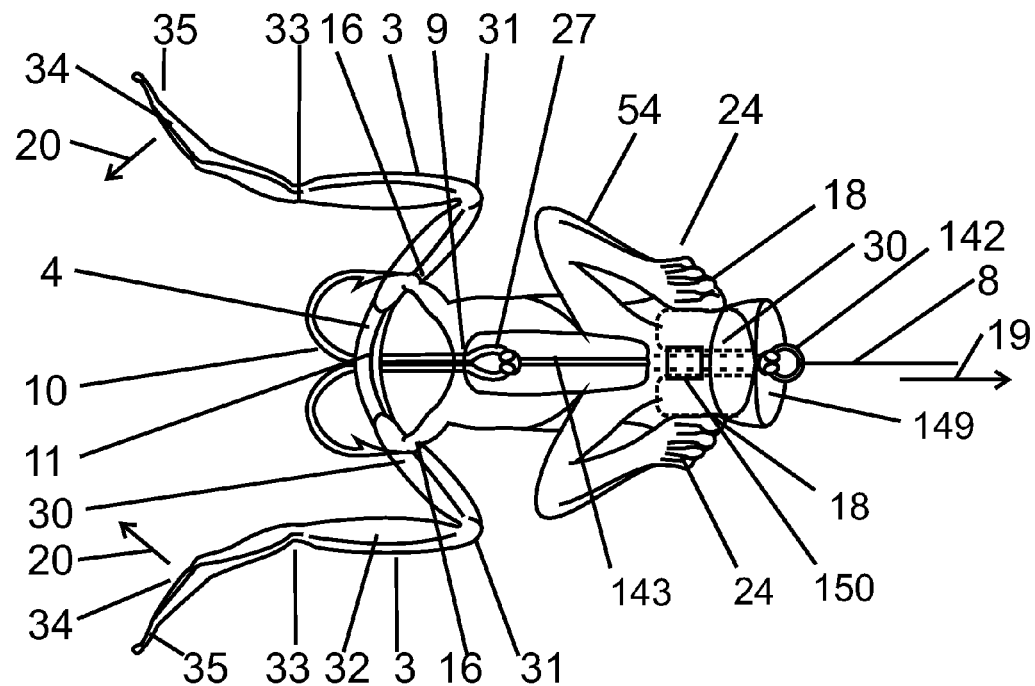
Figure 20C:
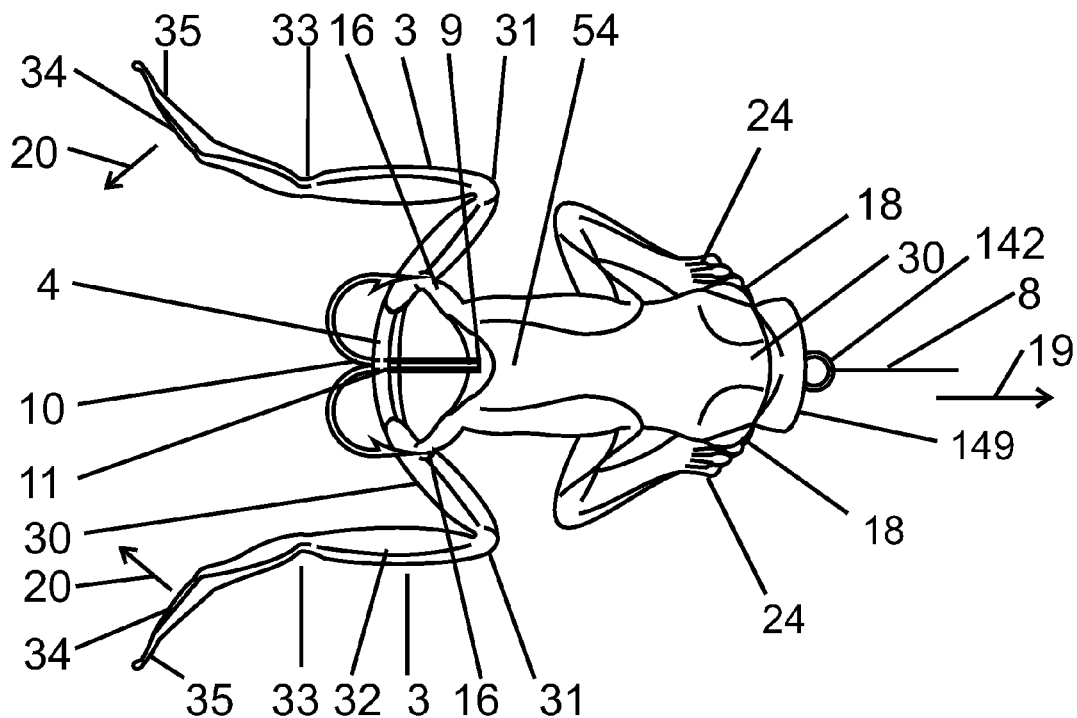
Figure 20D:
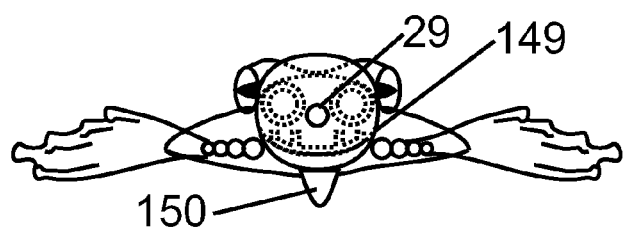
Figure 20E:
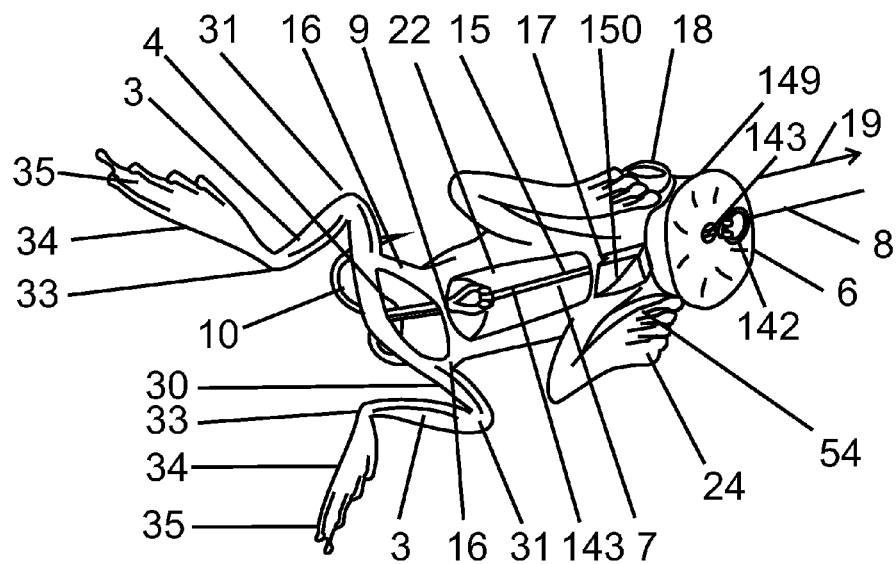
Figure 20F:
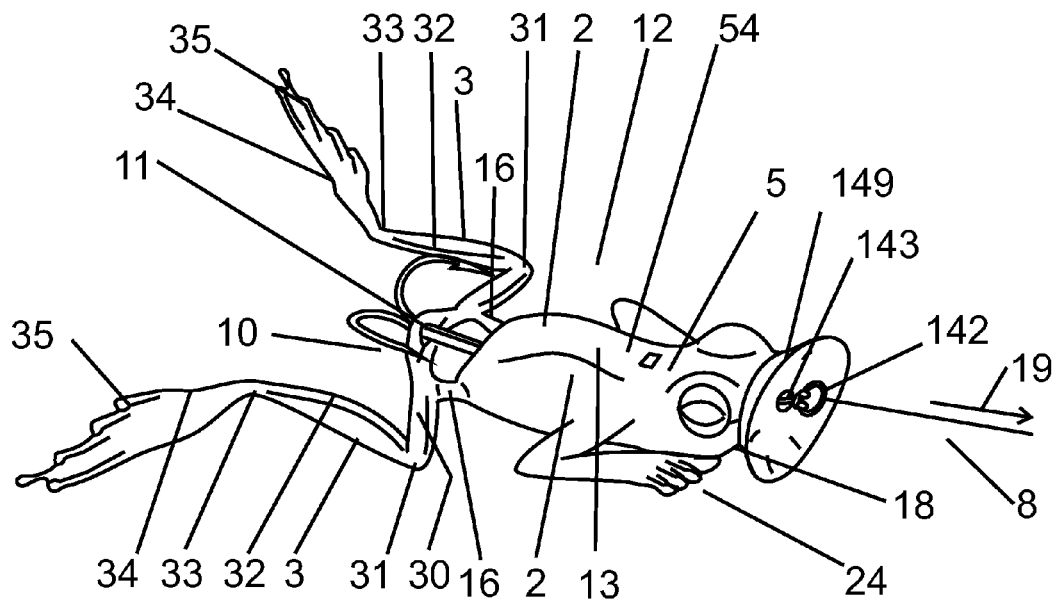

Referring to FIGS. 19 to 20, 2 alternative forms of the fishing lure are shown each having a body 2, legs 3, bridge 4 and pivots 16 as described in relation to FIGS. 1 to 9.

As shown in FIG. 19, a separate component 51 can be inserted into the forward portion 2 of fishing lure 53. The separate component fits relative to the fishing lure via a friction and or adhesive fit. The separate component 51 can include a top channel passage 55 and or a front channel passage 56 for the line to pass through the fishing lure 53 and tie off to the main hook 10. The separate component 51 can include an air pocket or buoyant material (ie density less than 1) to provide buoyancy to the fishing lure 53 so that in use it can be fished on the water's surface. Alternatively, the separate component 51 can include a cavity for retaining a weight to assist with sink in the fishing lure.

As shown in FIGS. 20 and 20a-f, a separate component 52 or 149 can be inserted into the forward portion 2 of fishing lure 54. The separate component 52 or 149 fits relative to the fishing lure via a friction and or adhesive fit. The separate component 52 or 149 can include a concave domed cup 28. The separate component 52 or 149 can include a front channel passage 57 for the line 8 or prerigged leader 143 with ring 142 attachment connected to the fishing line 8, to pass through the fishing lure 54 and tie off to the main hook 10. The separate component 52 can include an air pocket or buoyant material (ie density less than 1) to provide buoyancy to the fishing lure 54 so that in use it can be fished on the water's surface. A weight 150 can be fitted relative to the lure via friction fit, slide, adhesive or an alternative method, to act as a ballast and assist with righting the lure to the neutral upright position.

Figure 21:
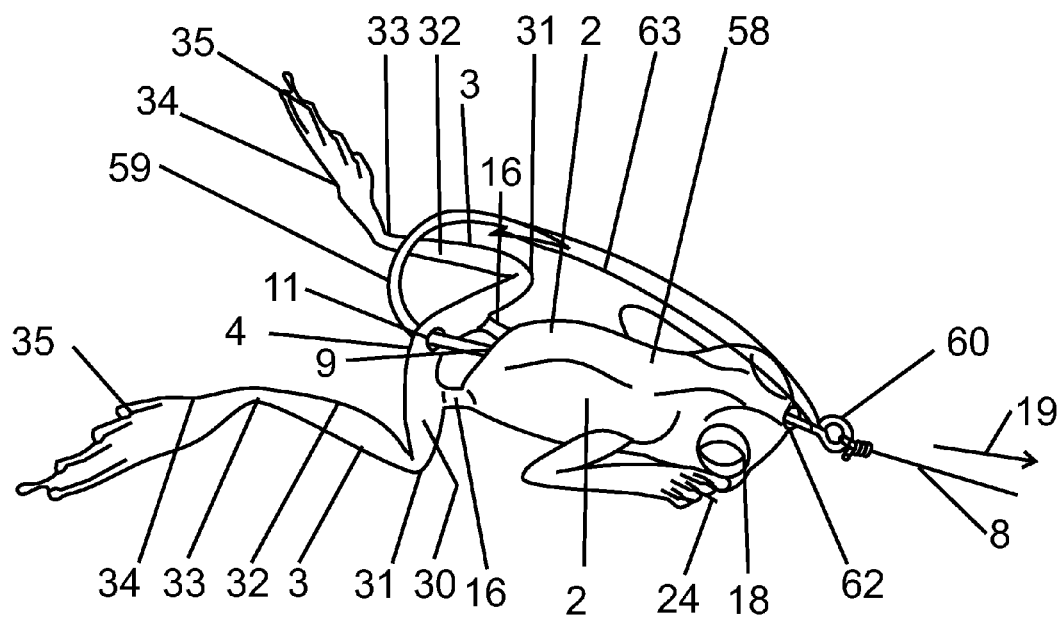
FIG. 21 is a perspective view of a fishing lure according to a further embodiment of the invention in a rest position, viewed from above with an alternative hook configuration.
Figure 22:
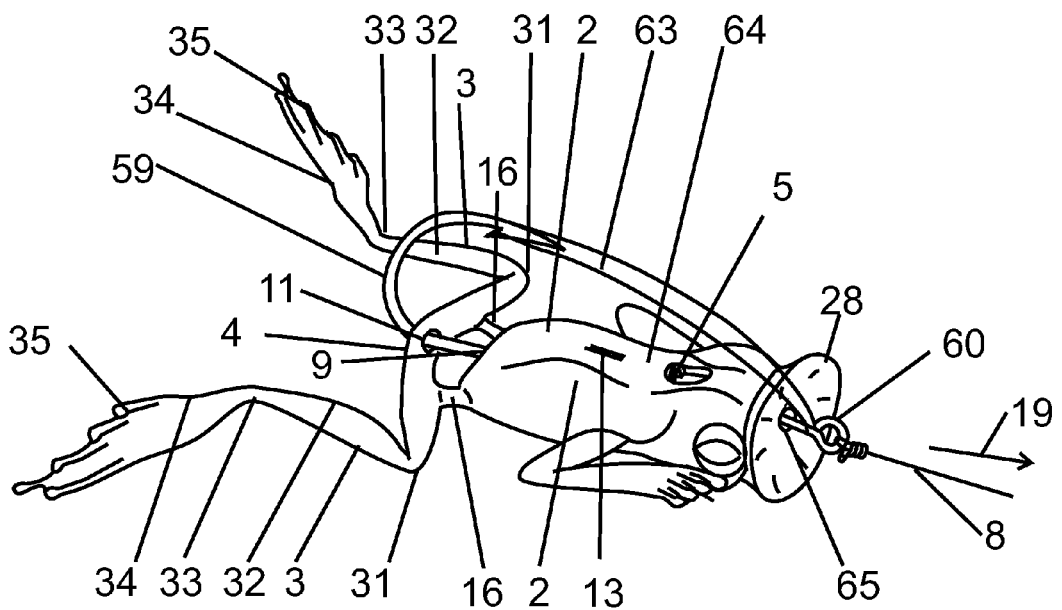
FIG. 22 is a perspective view of a fishing lure according to the embodiment of FIG. 21 in a rest position, viewed from above that includes a concave mouth/nose area and with an alternative hook configuration.

Referring to FIGS. 21 and 22, 2 alternative forms of fishing lure are shown each having a body 2, legs 3, bridge 4 and pivots 16 as described in relation to FIGS. 1 to 9.

In an arrangement of the fishing lure 58 as shown in FIG. 21, a single hook 59 passes through a front channel passage 6, through the body 2. The hook eye 60 is at the front of the lure 58 for the fishing line 8 to be connected to. The hook 59 passes slidably through the body 2, through the rear passage 9 and locates through the bridge passage 11, connecting the hook 59 to the bridge 4. In use, when the line is pulled, the hook pulls forward moving the bridge 4 as it pivots about the pivots 16, actuating the legs 3 to create at least to some extent the leg kicking action of a frog. The hook can include a weed guard 63 to prevent the fishing lure from becoming entangled in weeds.

In an alternative arrangement of the fishing lure 64 as shown in FIG. 22 which includes a concave forward projection 28, a single hook 59 pass through a front channel passage 65, through the forward portion 2. The hook eye 60 is at the front of the lure 64 for the fishing line 8 to be connected to. The hook 59 passes slidably through the body 2, through the rear passage 9 and locates through the bridge passage 11, connecting the hook 59 to the bridge 4. In use, when the line is pulled, the hook pulls forward moving the bridge 4 as it pivots about the pivots 16, actuating the legs 3 to create at least to some extent the leg kicking action of a frog. The hook can include a weed guard 61 to prevent the fishing lure from becoming entangled in weeds.

A form of the lure 1 is such that it is moulded to have a realistically simulated shape and proportions of a frog with simulated appendages. Further, the body segments are preferably moulded so as to be discernably distinct and realistically shaped to realistically simulate the actual shape of a frog.

The fishing lure in the frog arrangement may be moulded, for example, from a plastics material, to a shape simulating a number of different species within the frog species including and not limited to *Myobatrachidae, Microhylidae, Hylidae, Allophrynidae, Discoglossidae, Leiopelmatidae, Pelodytidae, Allophrynidae, Bombinatoridae, Cantrolenidae, Heleophrynidae, Hyperoliidae, Mantellidae, Myobatrachidae, Pelodytidae, Ranidae, Rhinophyrynidae, Artholeptidae, Brachycephalidae, Dendrobatidae, Hemisotidae, Megophryidae, Nasikabatrachidae, Pipidae, Rhacophoridae, Scaphiopodidae, Ascaphidae, Buforidae, Disconidae, Leptodactylidae, Pelobatidae, Pseudidae, Rhinodermatidae* and *Sooglossidae.*

In use, the fishing lure is attached to a fishing line by placing the hooks in position, threading the line through the hook or hooks and tying off the line. The lure can come prerigged with a short line and can include a loop at the front end for tying off to the line coming from the fishing apparatus.

The leg kicking action of the lure may be generated as the lure is retrieved back to the angler through the water after it is cast. The angler may work the lure on the surface or let the lure descend below the water surface and either move the lure through the water or permit it to decelerate or stop in the water depth. Using an accelerated twitching, flicking, pulling or tugging of the lure in a forward-moving direction can be intermittently used with the application of a slow retrieve action. This process of retrieving and inducing the flick can be repeated in a series of actions until the lure is returned to the angler.

The lure can generate the leg kicking action of the lure in addition to pushing water in a splashing action in the alternatives that include a concave front cup. These actions may be generated as the lure is retrieved back to the angler through the water after it is cast. The angler may use the lure without additional weights so that the lure remains close to or on the surface of the water. Using an accelerated twitching, flicking, pulling or tugging of the lure in a forward-moving direction can be intermittently used with the application of a slow retrieve action. This process of retrieving and inducing the flick can be repeated in a series of actions until the lure is returned to the angler.

The frog lure embodiment of the invention advantageously simulates the physical characteristics of a range of species in the frog subphylum and are adapted to simulate a forward slow swimming action as well as a distress response leg articulation or kicking action. Embodiments of the invention may include one or more of the following advantageous features:

The flexible connection permits the movement of the legs 3 of the device in a rotational flexing motion and includes the biasing means which returns the bridge 4 to the neutral or rest position. The lure 1 can rapidly adopt the flexed position to simulate the rapid leg movement upon rapid tugging of the fishing line. The degree of pivoting of the legs 3 will depend upon the degree of force applied to the fishing line in the tugging action. The lure 1 may be relatively static in the water in a "neutral" swimming position, and the leg kicking motion induced by a tugging or flicking of the fishing line. Alternatively, or in combination, a steady tension may be applied to the fishing line to induce a swimming action. Scented or flavoured pellets, lotions, powders, oils or such like can be applied or moulded into the lure material including cavities to assist in attracting fish to the lure.

Many features described in relation to the simulated frog lures will be applicable to other simulated bait species and imaginary creatures not explicitly adverted to herein but encompassed by the spirit and scope of the invention.

While the above description is made by way of illustrative examples of the present invention, various modifications or variations will be apparent to persons skilled in the art without departing from the spirit and scope of the invention.

FIGS. 23*a-h* refer to a bait fish lure embodiment of the invention. The fish version of the lure simulates a bait species that can include mullet, pilchards, sardines, herring, eel and any other kind of fish commonly used as bait for fishing. More preferably, the lure simulates a bait fish 66.

Figure 23A:
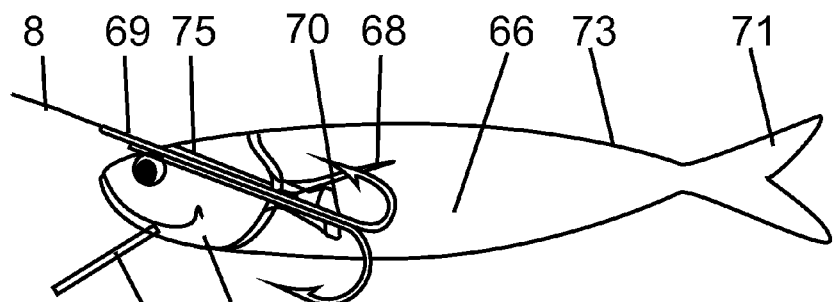
FIGS. 23a-l include side and top views of alternative embodiments of the lure according to a bait fish simulation FIGS. 24a-j include top, bottom and perspective views of alternative embodiments of the fishing lure according to a crab simulation FIGS. 25a-f include side and top views of alternative embodiments of a fishing lure according to a turtle simulation FIGS. 26a-d include side and top views of alternative embodiments of a fishing lure according to a bug or insect simulation
Figure 23B:
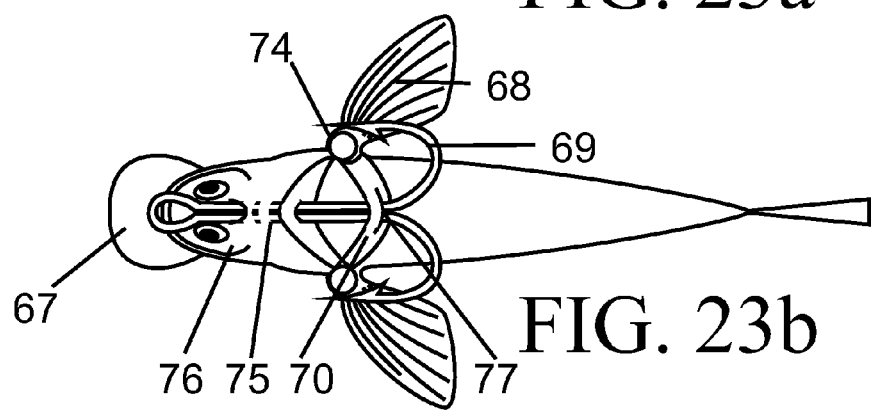
Figure 23C:
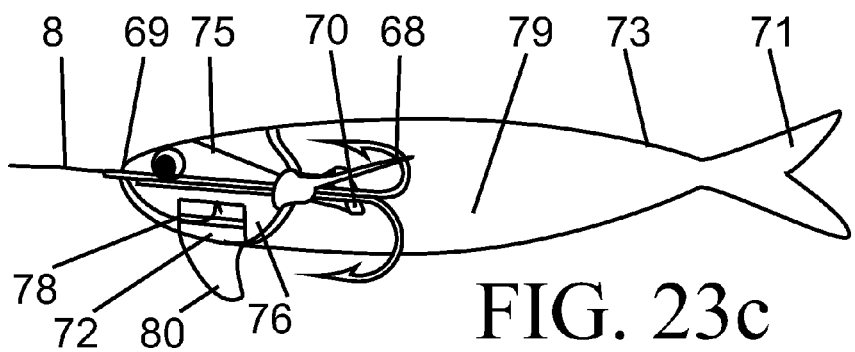
Figure 23D:
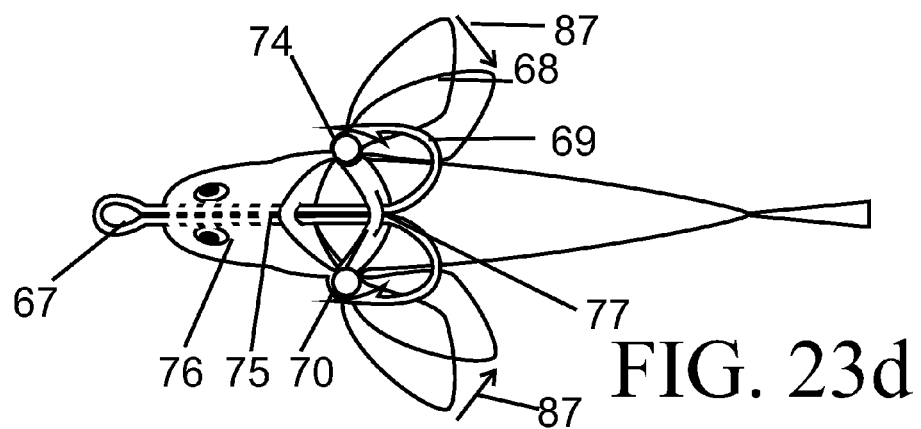

The bait fish 66 includes a body 73, fins 68, bridge 70 and pivots 74. The pivots 74 are connected by a bridge 70. A passage 75 extends through the body 2. The passage 75 opens at one end centrally behind the head 76. In use, a fishing line 8 is connected to a main hook 69 which passes through the passage 75. The area behind the head 76 is hollowed out to permit the main hook 69 to run through the head 76. A main hook 69 in the form of a treble hook, double hook or single hook is inserted through a bridge passage 77 in the bridge 70, passing through the head 76 via the passage 75 so that the main hook 69 can be connected to the fishing line 8. In use, when the line 8 is pulled in the direction 19, the bridge 70 is pulled forward pivoting about pivots 74 so that the gap between the bridge 70 and the rear of the head 76 closes in distance. This pivoting motion causes the armatures or fins 68 to move or rotate backwards as shown in FIG. 23*d* where the fins 68 have moved to a flexed position in the direction 87. After the line 8 is pulled, the bridge 70 returns to its neutral position simulating the fin movement of a swimming fish.

The front portion of the bait fish can include at least one forward projection extending therefrom and having sufficient surface area so as to meet with inertial resistance of the water against forward movement of the lure when the lure is pulled forward. The forward projection can be referred to as a bib or lip 67. Advantageously, the forward projection may be enlarged to meet with greater inertial resistance when the lure is pulled forward, thereby leaving the lure within closer proximity of an interested fish while facilitating a stronger fin/tail action of the fish bait lure.

In an alternative arrangement, a weight 72 and or protruding fins 80 can be fitted to a cavity 78 in the head 76 or body 73 of the bait fish 79. The weight 72 provides additional mass to assist with sinking of the fish bait 79 in the water column. Alternatively, a floatation element can be added to the bait fish to provide buoyancy. One or more protruding fins 80 can extend from the lure body or weight 72 which can act as a guard for the hook points to prevent them from being entangled with underwater structure and weeds.

Figure 23E:
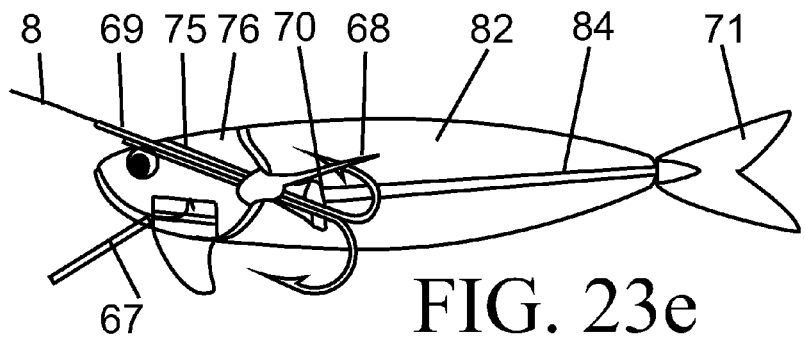
Figure 23F:
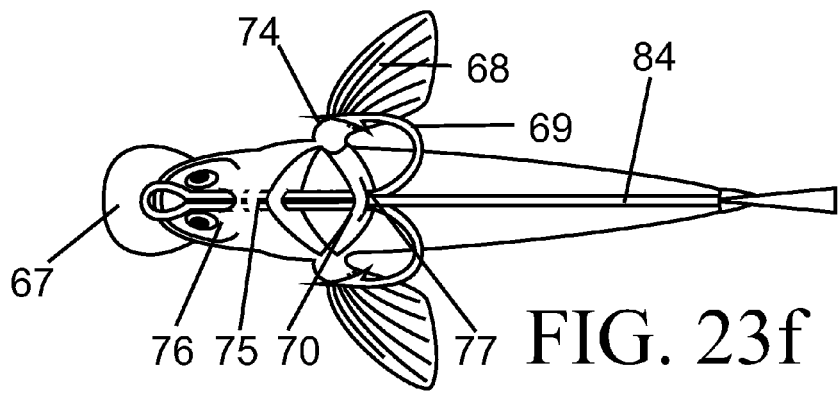

Referring to FIGS. 23*e*-23*f*, an alternative bait fish lure 82 includes a link element 84 which can be connected to either the main hook 69 or the bridge 70. The link element 84 connects to the tail area of the bait fish lure 82. In operation, when the line is pulled by the operator, the main hook 69 moves forward with the flexion of the bridge 70 which is connected via the link element 84 to the tail, causing a pulsing or darting action of the tail 71 which can add tail pressure waves and erratic motion which can be attractive to predatory fish. The bait fish lure 82 can include more than one parts connected via friction or adhesive fitment.

Figure 23G:
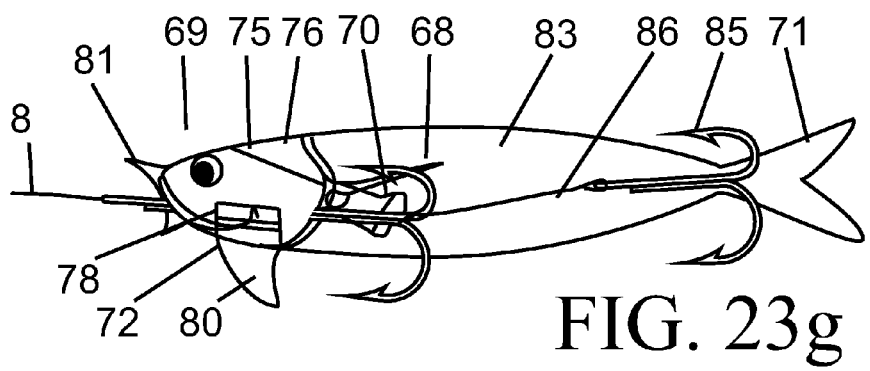
Figure 23H:
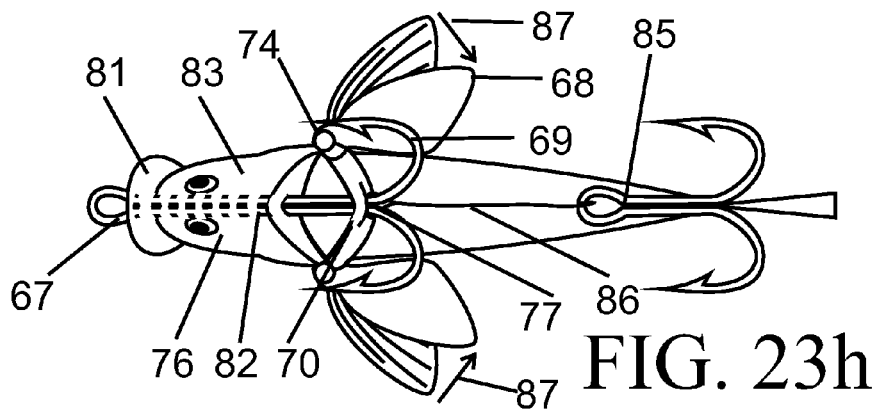

Referring to FIGS. 23*g*-23*h*, an alternative bait fish lure 83 includes a concave forward projection 81 at the front of the head 76. The concave forward projection 81 can include a front channel passage 82 for the main hook 69 to pass through and tie off to the line 8. In operation, when the line is pulled by the operator, the lure can push water, causing a turbulent or splashing effect when fished on the water surface in combination with the fin rotation action.

In another alternative arrangement, an additional hook 85 locates in the rear area of the bait fish body towards the tail 71. It is linked to the main line 8, main hook 69 or bridge 70 via a wire, line or cord 86. The additional hook increases the likelihood of a fish striking the lure being hooked. The cord 86 can act in a similar fashion to the link element 84 connecting the moving elements 69, 70 and 74 to the tail area of the bait fish to generate a pulsing or darting effect from the tail.

Figure 23I:
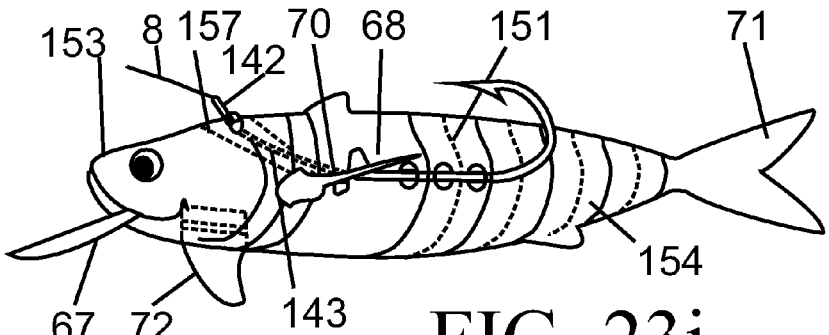
Figure 23J:
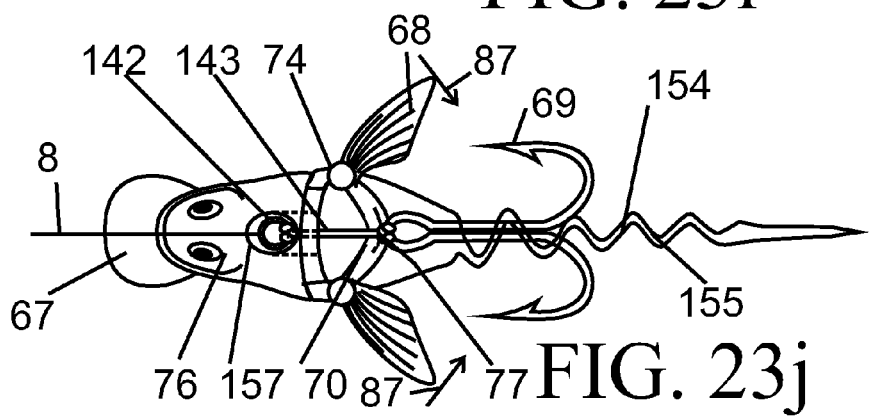

Referring to FIGS. 23*i*-23*j*, an alternative bait fish lure 151 includes a front head 153 and an adjoining rear body and tail segment 154. The front head 153 can include a front channel passage 157 for the line 8 or prerigged leader 143 with ring 142 attachment connected to the fishing line 8, to pass through front head 153 and tie off to the main hook 69. The bait fish 151 includes fins 68, bridge 70 and pivots 74. The pivots 74 are connected by a bridge 70. The front head 153 is made from a flexible material that includes reflex properties between a neutral and flexed position. The rear body and tail segment 154 is made from a flexible soft plastic material that can be moulded to include a Kevlar or other composite material film to add reinforcement to the soft plastic material. The rear body and tail segment 154 includes a shaped or corrugated profile 155 which the main hook 69 passes through and engages with. The rear body and tail segment 154 fits relative to the front head 153 via a friction and or adhesive fit. A passage 157 extends through the front head 153. The passage 75 opens at one end centrally behind the head.

In use, a fishing line 8 is connected to a ring 142 with prerigged leader 143 to a main hook 69 which activates against the bridge 70. In use, when the line 8 is pulled in the direction 19, the bridge 70 is pulled forward pivoting about pivots 74 so that the gap between the bridge 70 and the rear of the head closes in distance. This pivoting motion causes the armatures or fins 68 to move or rotate backwards where the fins 68 have moved to a flexed position in the direction 87. The pivoting motion also engages the main hook 69 to engage with the corrugated profile 155 of the rear body and tail segment 154. The corrugated profile 158 is compressed, sending a pulse or movement of the tail segment in the water. After the line 8 is pulled, the bridge 70 returns to its neutral position and the corrugated profile 155 decompresses, simulating the fin and tail movement of a swimming fish.

Figure 23K:
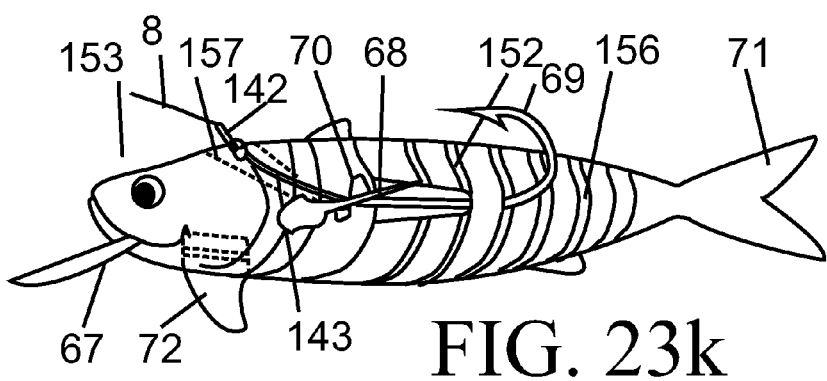
Figure 23L:
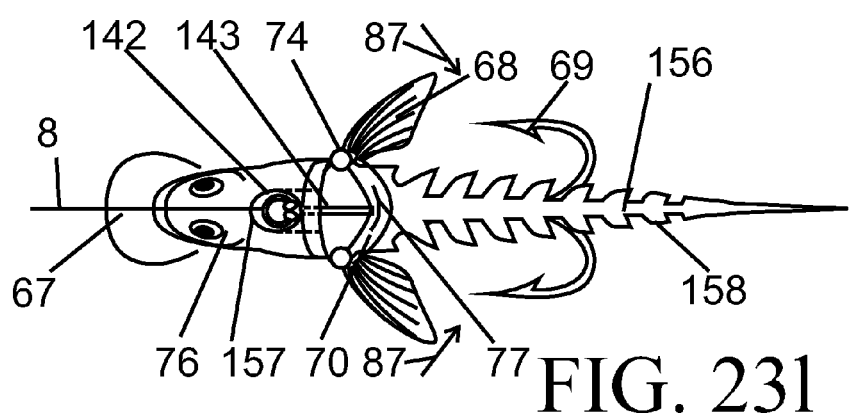
Figure 24A:
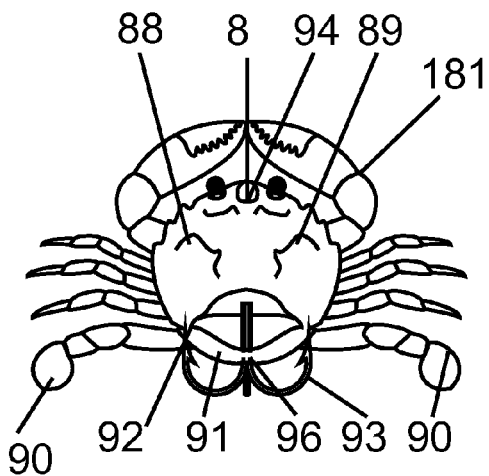
Figure 24B:
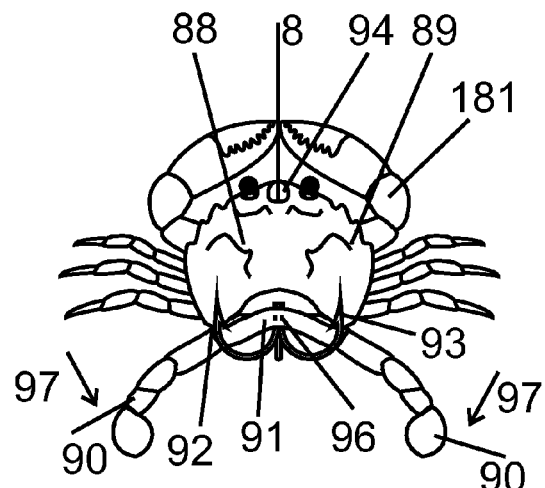
Figure 24C:
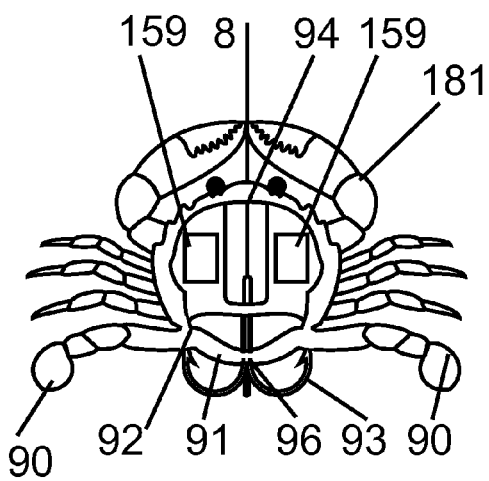
Figure 24D:
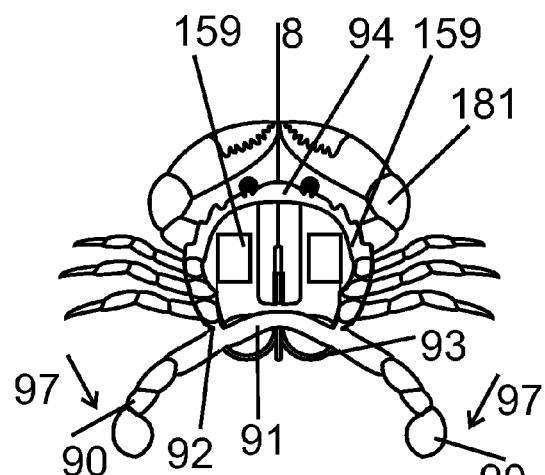
Figure 24E:
Figure 24F:
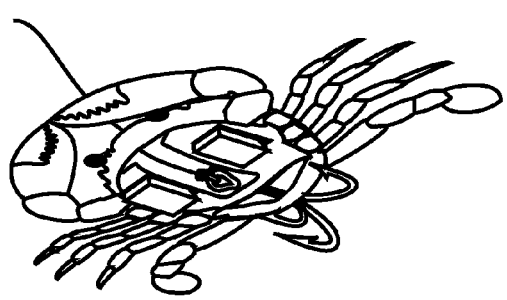
Figure 24G:
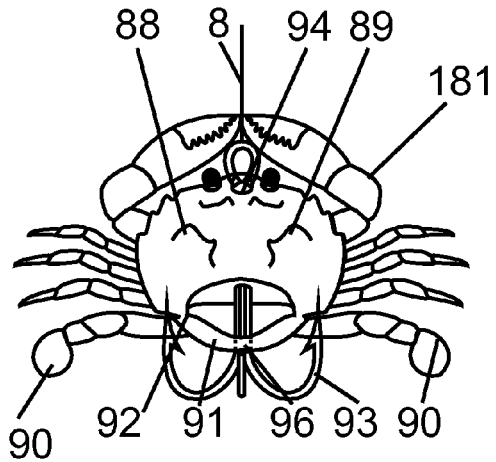
Figure 24H:
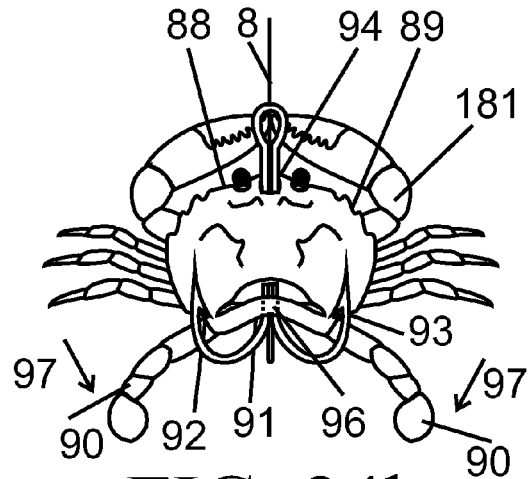
Figure 24I:
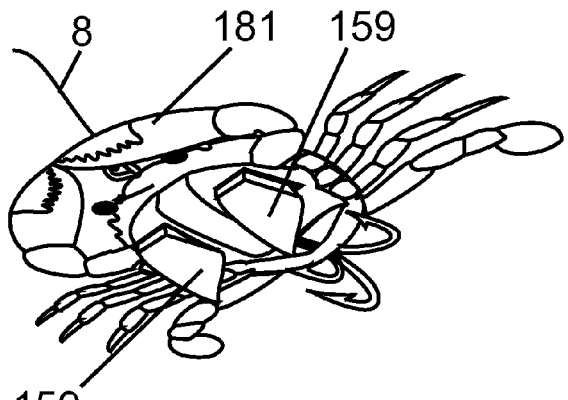
Figure 24J:

Referring to FIGS. 23*k*-23*l*, an alternative bait fish lure 152 includes a front head 153 and an adjoining rear body and tail segment 156. The front head 153 can include a front channel passage 157 for the line 8 or prerigged leader 143 with ring 142 attachment connected to the fishing line 8, to pass through the front head 153 and tie off to the main hook 69. The bait fish 152 includes fins 68, bridge 70 and pivots 74. The pivots 74 are connected by a bridge 70. The front head 153 is made from a flexible material that includes reflex properties between a neutral and flexed position. The rear body and tail segment 156 is made from a flexible soft plastic material that can be moulded to include a ribbed profile 158 which the main hook 69 passes through and engages with. The rear body and tail segment 156 fits relative to the front head 153 via a friction and or adhesive fit. A passage 157 extends through the front head 153. The passage 157 opens at one end centrally behind the head.

In use, a fishing line 8 is connected to a ring 142 with prerigged leader 143 to a main hook 69 which activates against the bridge 70. In use, when the line 8 is pulled in the direction 19, the main hook 69 engages the bridge 70 which is pulled forward pivoting about pivots 74 so that the gap between the bridge 70 and the rear of the head 153 closes in distance. This pivoting motion causes the armatures or fins 68 to move or rotate backwards where the fins 68 have moved to a flexed position in the direction 87. The pivoting motion also engages the main hook 69 to engage with the ribbed profile 158 of the rear body and tail segment 156. The ribbed profile 158 is engaged, sending a pulse or movement of the rear body and tail segment 156 in the water. After the line 8 is pulled, the bridge 70 and the ribbed profile 158 returns to its neutral position, simulating the fin and tail movement of a swimming fish.

FIGS. 24*a*-*f* refer to an alternative embodiment of the lure according to a crab bait simulation. The crab lure 88 includes a body 89, weights 159, flippers 90, bridge 91 and pivots 92. The pivots 92 are connected by a bridge 91. A passage 94 extends through the body 89. In use, a fishing line 8 is connected to a main hook 93 which is inserted through a bridge passage 96 in the bridge 91, passing through the body 89 via the passage 94 so that the main hook 93 can be connected to the fishing line 8. In use, when the line 8 is pulled forward, the bridge 91 is pulled forward pivoting about pivots 92 so that the gap between the bridge 91 and the rear of the body 89 closes in distance. This pivoting motion causes the pivot arms in the form of flippers 90 to move or rotate backwards in the direction 97. After the line 8 is pulled, the bridge 91 returns to its neutral position simulating to some extent the flipper movement of a crab. The weights 159 can be fitted by friction or adhesive fit, adds casting weight and acts as ballast for the crab to swim in a neutral upright posture. The claws 181 project forward of the body 89, acting as a resistance to forward movement. There is a gap between the line 8 entry point 94 and the claws 181, such that the claws 181 act as a leverage member for moving the crab lure 88 over underwater structures and obstructions when pulled forward in the water.

FIGS. 24*g-j* refer to an alternative embodiment of the lure according to a crab bait simulation. The crab lure 88 includes a body 89, weights 159, flippers 90, bridge 91 and pivots 92. The pivots 92 are connected by a bridge 91. A passage 94 extends through the body 89. In use, a fishing line 8 is connected to a main hook 93 which is inserted through a bridge passage 96 in the bridge 91, passing through the body 89 via the passage 94 so that the main hook 93 can be connected to the fishing line 8 at the front of the body 89. In use, when the line 8 is pulled, the main hook engages the bridge 91 which is pulled forward pivoting about pivots 92 so that the gap between the bridge 91 and the rear of the body 89 closes in distance. This pivoting motion causes the pivot arms in the form of flippers 90 to move or rotate backwards in the direction 97. After the line 8 is pulled, the bridge 91 returns to its neutral position simulating to some extent the flipper movement of a crab. The weights 159 can be fitted by friction or adhesive fit, add casting weight to the lure and act as ballast for the crab to swim in a neutral upright posture. The claws 181 project forward of the body 89, acting as a resistance to forward movement. There is a gap between the line 8 entry point 94 and the claws 181, such that the claws 181 act as a leverage member for moving the crab lure 88 over underwater structures and obstructions when pulled forward in the water.

FIGS. 25*a-d* refer to an alternative embodiment of the lure according to a turtle or tortoise bait simulation. The turtle lure 98 includes a head 99, body 160, weight 161, flippers 100, bridge 101 and pivots 102. The pivots 102 are connected by a bridge 101. A passage 104 extends through the head 99. In use, a fishing line 8 is connected to a main hook 103 which is inserted through a bridge passage 105 in the bridge 101, passing through the head 99 via the passage 104 so that the main hook 103 can be connected to the fishing line 8. In use, when the line 8 is pulled, the bridge 101 is pulled forward pivoting about pivots 102 so that the gap between the bridge 101 and the rear of the passage 104 closes in distance. This pivoting motion causes the pivot arms in the form of flippers 100 to move or rotate backwards in the direction 106. A connection link 107 from the bridge 101 or main hook 103 can additionally activate the rear flippers 108. After the line 8 is pulled, the bridge 101 returns to its neutral position simulating to some extent the flipper movement of a turtle. The weight 161 can be fitted by friction or adhesive fit, adds casting weight to the lure and acts as ballast for the turtle to swim in a neutral upright posture.

Figure 25A:
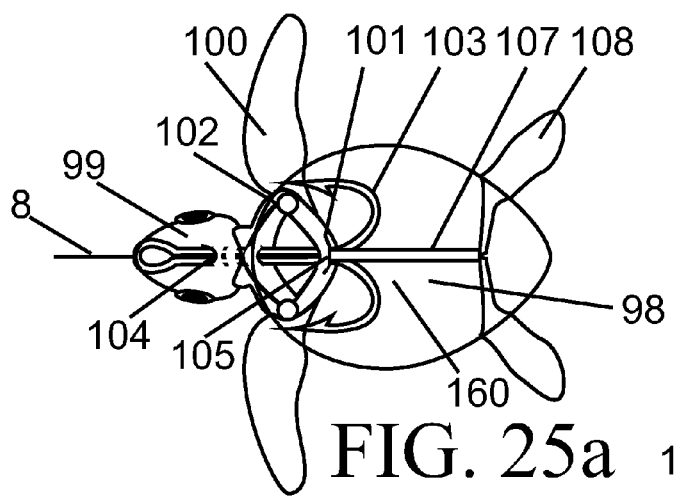
Figure 25B:
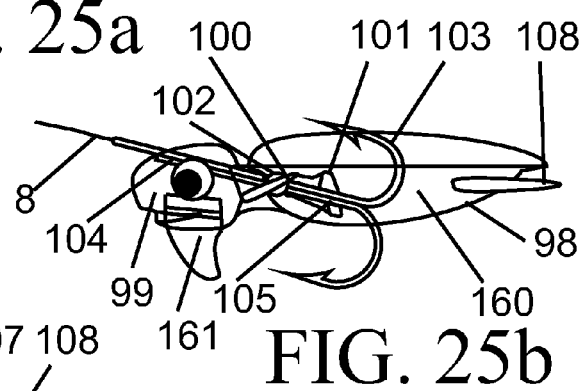
Figure 25C:
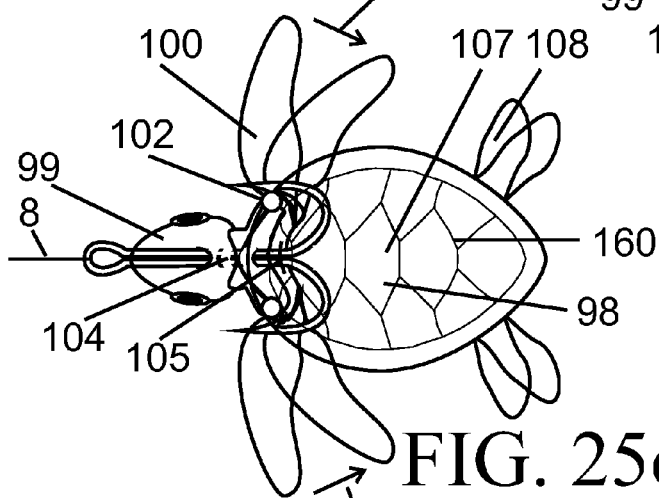
Figure 25D:
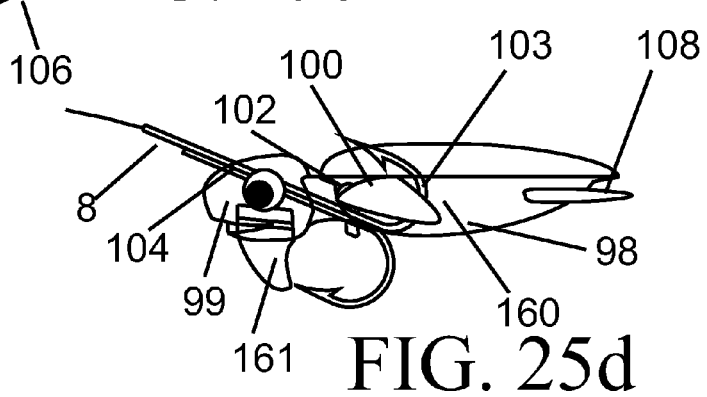
Figure 25E:
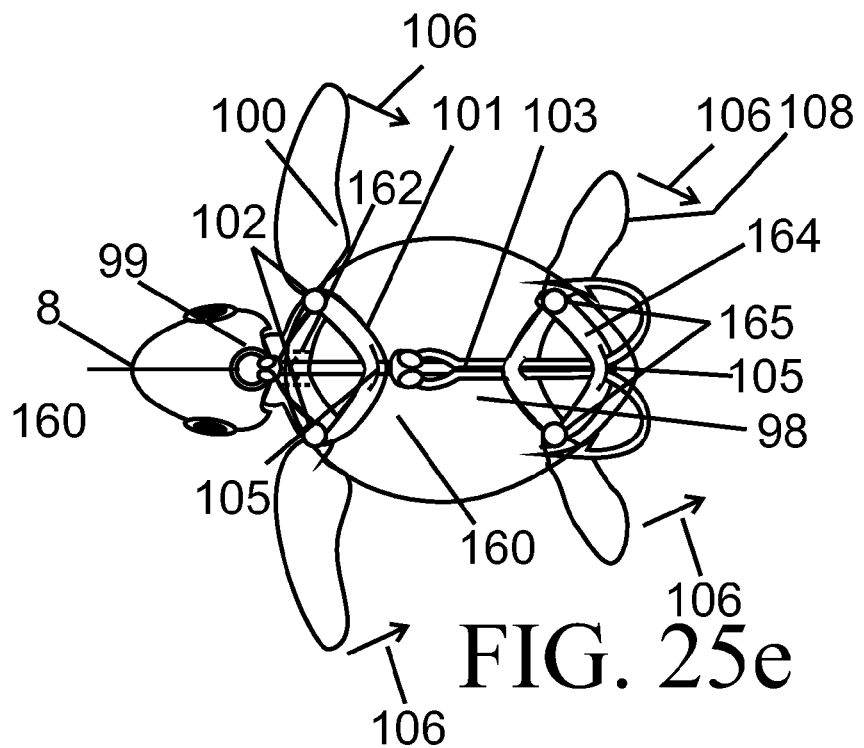
Figure 25F:
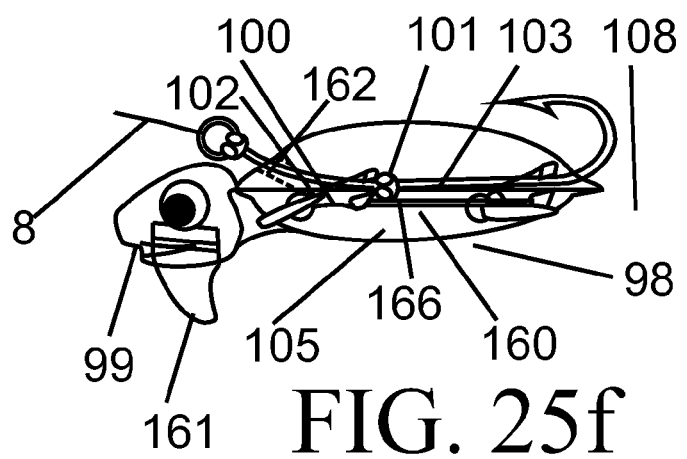
Figure 26A:
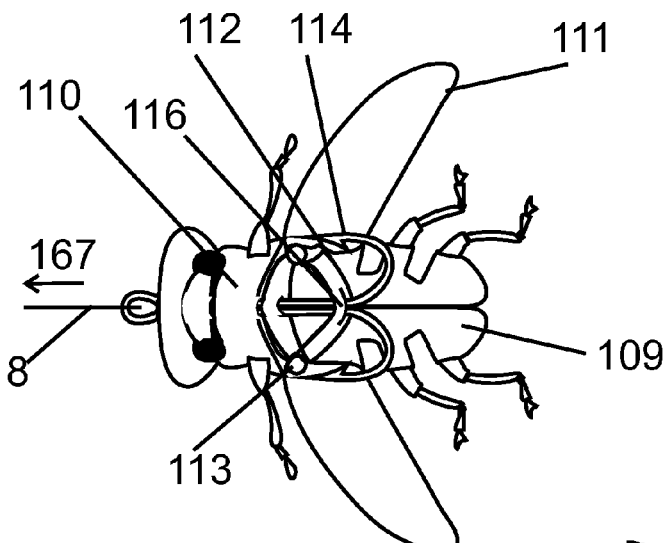
Figure 26B:
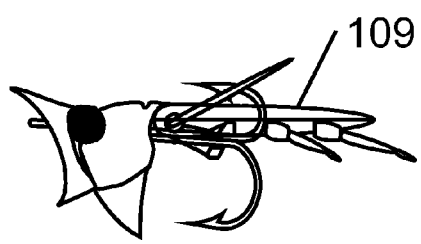
Figure 26C:
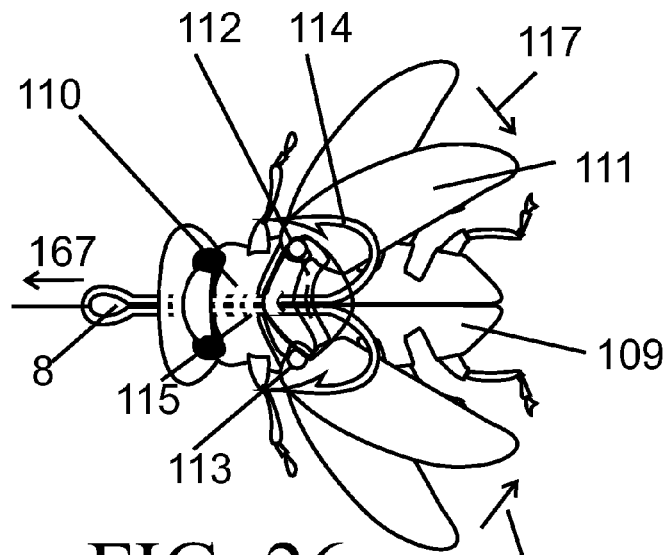
Figure 26D:
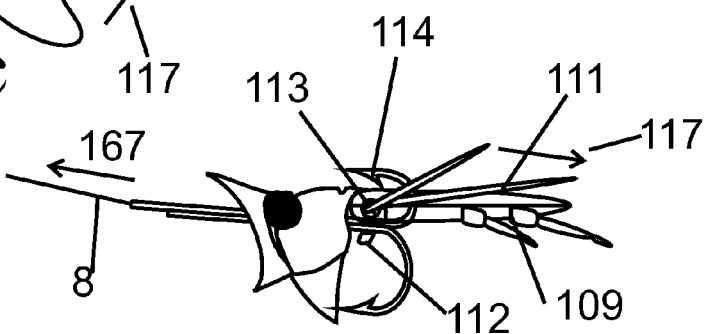

FIGS. 25*e-f* refer to an alternative embodiment of the lure according to a turtle or tortoise bait simulation. The turtle lure 98 includes a head 99, body 160, weight 161, flippers 100, front bridge 101, front pivots 102, rearbridge 164 and rear pivots 165. The front pivots 102 are connected by a front bridge 101. The rear pivots 165 are connected by a rear bridge 164. A passage 162 extends through the body 160. In use, a fishing line 8 is connected to a ring 142 and pre-rigged leader 143 which is connected to a main hook 103 which is inserted through a bridge passage 105 in the rear bridge 164 and butting up to the front bridge 101. The pre-rigged leader 143 passes through the body via the passage 162 so that the main hook 103 can be connected to the fishing line 8. In use, when the line 8 is pulled, the rear bridge 164 is pulled forward pivoting about pivots 165. Simultaneously, the front bridge 101 is pulled forward pivoting about pivots 102 so that the gap between the bridge 101 and the rear of the passage 162 closes in distance. This pivoting motion causes the pivot arms in the form of front flippers 100 to move or rotate backwards in the direction 106 and the rear flippers 108 to move or rotate backwards in the direction 106. A connection link 166 from the bridge 101 or main hook 103 can additionally activate the rear flippers 108. After the line 8 is pulled, the front bridge 101 and rear bridge 164 returns to their neutral position simulating to some extent the flipper movement of a turtle. The weight 161 can be fitted by friction or adhesive fit, adds casting weight to the lure and acts as ballast for the turtle to swim in a neutral upright posture.

FIGS. 26*a-d* refer to an alternative embodiment of the lure according to a bug or insect bait simulation. Preferably, the bug version of the lure simulates a beetle, cockroach, dragonfly, cicada, grasshopper and any other insect species used as bait for fishing. The bug lure 109 includes a body 110, wings 111, bridge 112 and pivots 113. The pivots 113 are connected by a bridge 112. A passage 115 extends through the body 110. In use, a fishing line 8 is connected to a main hook 114 which is inserted through a bridge passage 116 in the bridge 112, passing through the body 110 via the passage 115 so that the main hook 114 can be connected to the fishing line 8. In use, when the line 8 is pulled forward in direction 167, the bridge 112 is pulled forward pivoting about pivots 113 so that the gap between the bridge 112 and the rear of the passage 115 closes in distance. This pivoting motion causes the pivot arms in the form of wings 111 to move or rotate backwards in the direction 117. After the line 8 is pulled, the bridge 112 returns to its neutral position simulating to some extent the wing movement of a bug.

Figure 27:
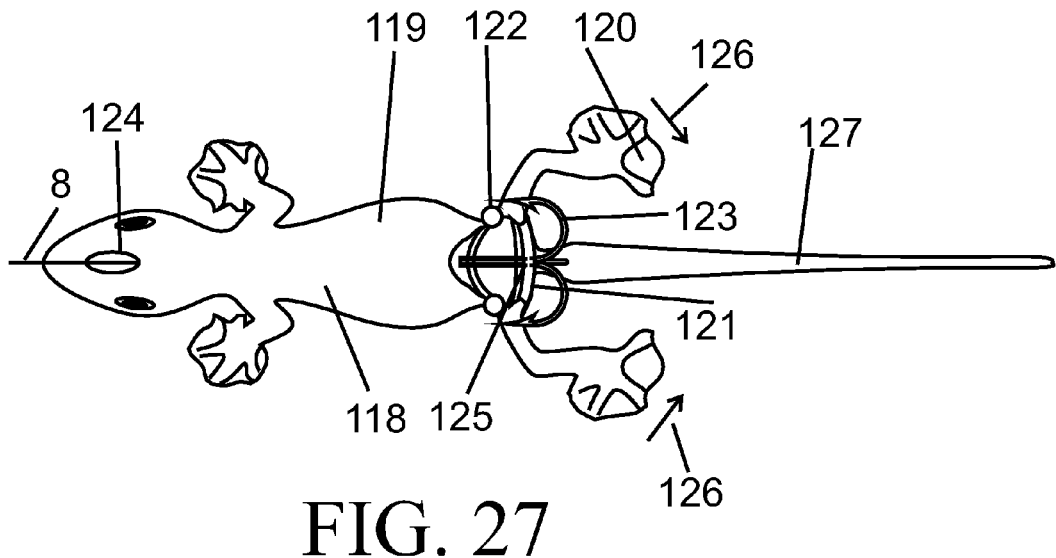
FIGS. 27-27a are top views of alternative embodiments of a fishing lure according to a lizard simulation

FIG. 27 refers to an alternative embodiment of the lure according to a lizard bait simulation. The lizard lure 118 includes a body 119, legs 120, bridge 121 and pivots 122. The pivots 122 are connected by a bridge 121. A passage 124 extends through the body 119. In use, a fishing line 8 is connected to a main hook 123 which is inserted through a bridge passage 125 in the bridge 121, passing through the body 119 via the passage 124 so that the main hook 123 can be connected to the fishing line 8. In use, when the line 8 is pulled, the bridge 121 is pulled forward pivoting about pivots 122 so that the gap between the bridge 121 and the rear of the body 119 closes in distance. This pivoting motion causes the pivot arms in the form of legs 120 to move or rotate backwards in the direction 126. The tail 127 is connected to the bridge 121 or hook 123 and moves in alignment with the line pull. After the line 8 is pulled, the bridge 121 returns to its neutral position simulating to some extent the leg and tail movement of a lizard.

Figure 27A:
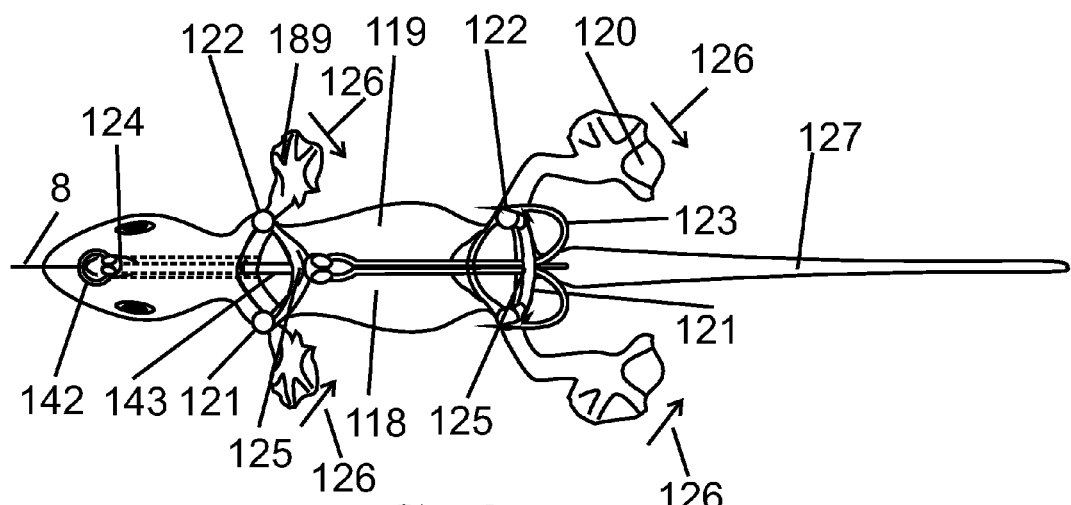

FIG. 27*a* refers to an alternative embodiment of the lure according to a lizard bait simulation. The lizard lure 118 includes a body 119, front legs 189 and back legs 120, bridges 121 and pivots 122. The pivots 122 are connected by a bridge 121. A passage 124 extends through the body 119. In use, a fishing line 8 is connected to a ring 142 with prerigged leader 143 to a main hook 123 which is inserted through a bridge passage 125 in the bridge 121, passing through the body 119 via the passage 124. When the line 8 is pulled, the bridge 121 is pulled forward pivoting about pivots 122 so that the gap between the bridge 121 and the rear of the body 119 closes in distance. This pivoting motion causes the pivot arms in the form of front legs 189 and back legs 120 to move or rotate backwards in the direction 126. The tail 127 is connected to the bridge 121 or hook 123 and moves in alignment with the line pull. After the line 8 is pulled, the bridge 121 returns to its neutral position simulating to some extent the leg and tail movement of a lizard.

Figure 28:
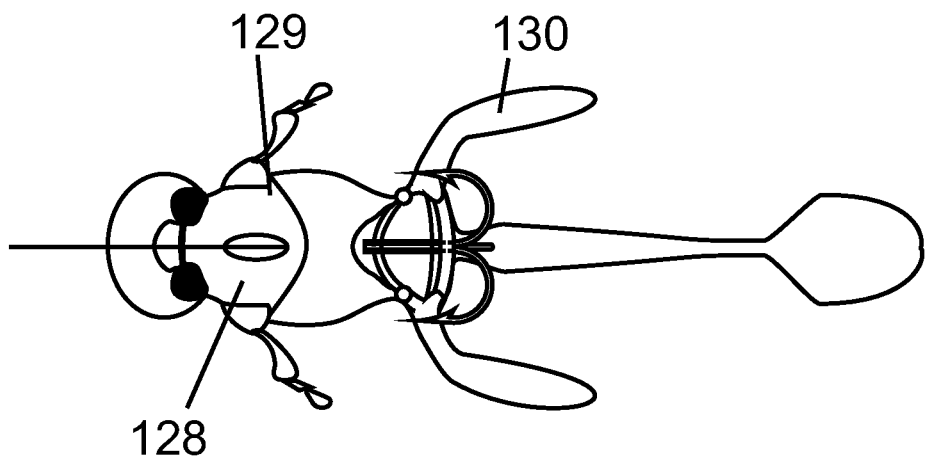
FIG. 28 is a top view of alternative embodiments of a fishing lure according to an imaginary creature simulation

FIG. 28 refers to an alternative embodiment of the lure according to an imaginary creature bait simulation. The imaginary creature lure 128 includes a body 129, pivot arms 130, bridge 131 and pivots 132.

Figure 29:
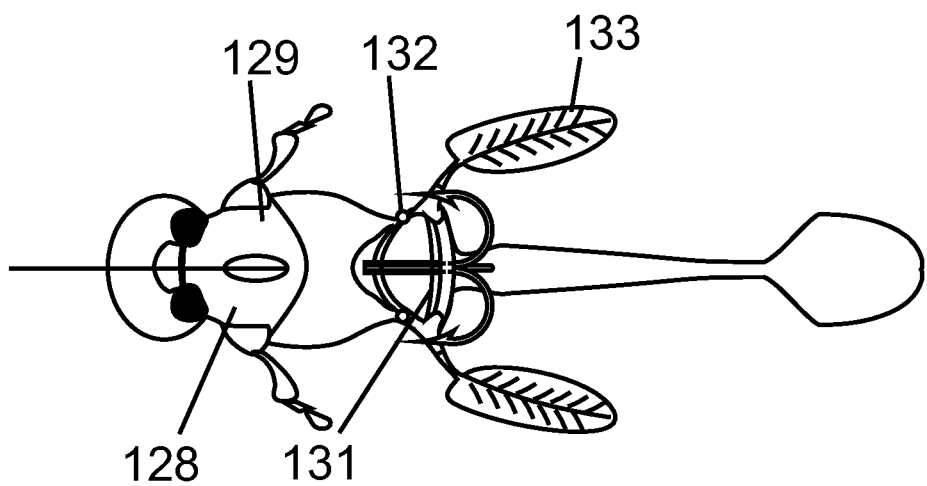
FIG. 29 is a top view of a fishing lure according to the embodiment of FIG. 28; with a pivot arm that includes a feather FIGS. 30a-c include side and top views of alternative embodiments of a fishing lure according to a squid simulation and a method for armature attachment FIGS. 31a-b include sectional side views of armature attachments

FIG. 29 refers to the embodiment of FIG. 28; with a pivot arm being a feather 133.

Figure 30A:
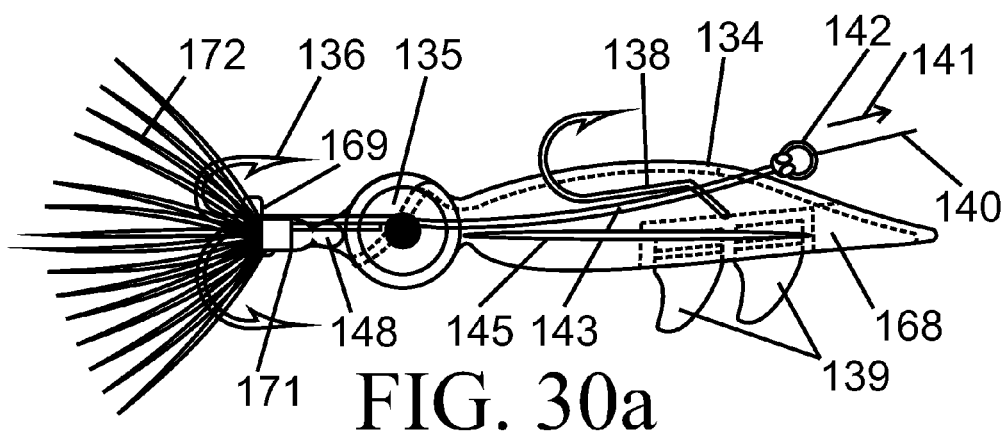
Figure 30B:
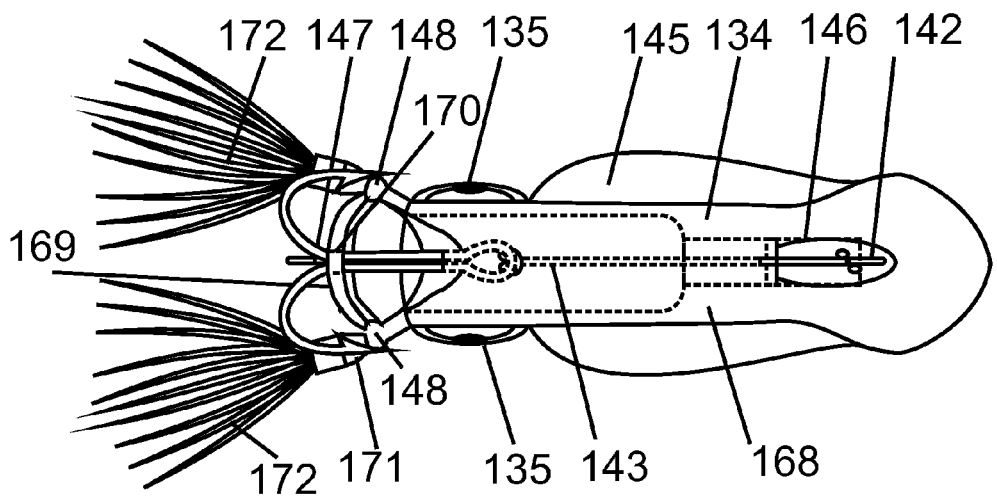
Figure 30C:
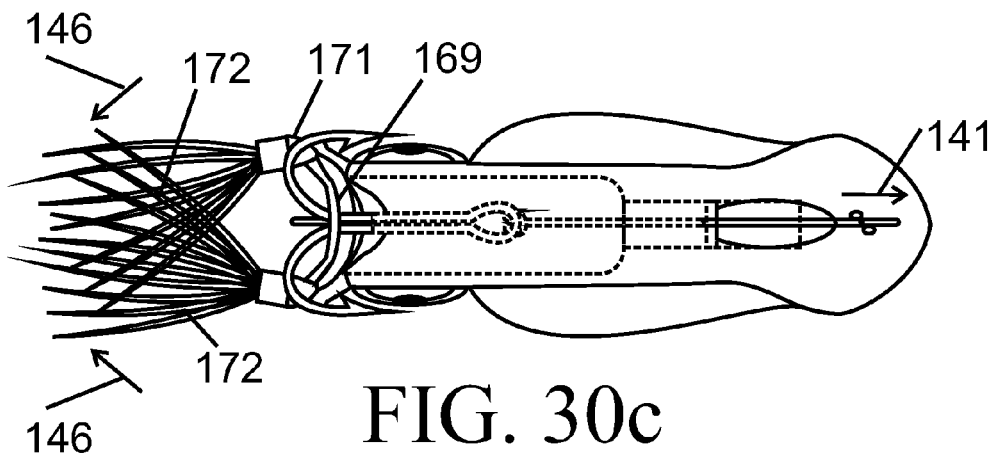

FIGS. 30a-c refer to an alternative embodiment of the lure according to a squid or cuttlefish bait simulation. The squid lure 134 includes a body 168, eye 135, weights 139, fins 145, armatures 171, tentacles 172, bridge 169 and pivots 148. The pivots 148 are connected by a bridge 169. A passage 146 extends through the body 168. In use, a fishing line 8 is connected to a ring 142 and pre-rigged leader 143 which is connected to a main hook 147 which is inserted through a bridge passage 170 in the bridge 169, passing through the body 168 via the passage 146. Armatures 171 connected to the pivots 148 include engagement methods for connecting tentacles 172. In use, when the line 8 is pulled, the bridge 169 is pulled forward pivoting about pivots 148 so that the gap between the bridge 169 and the rear of the body 168 closes in distance. This pivoting motion causes the armatures 171 with tentacle attachments 172 to move or rotate backwards in the direction 146. After the line 8 is pulled, the bridge 169 returns to its neutral position simulating to some extent the tentacle and arm movement of a squid. The weights 139 can be fitted by friction or adhesive fit, adding casting weight and acts as ballast for the squid to swim and sink in a neutral upright posture.

Figure 31A:
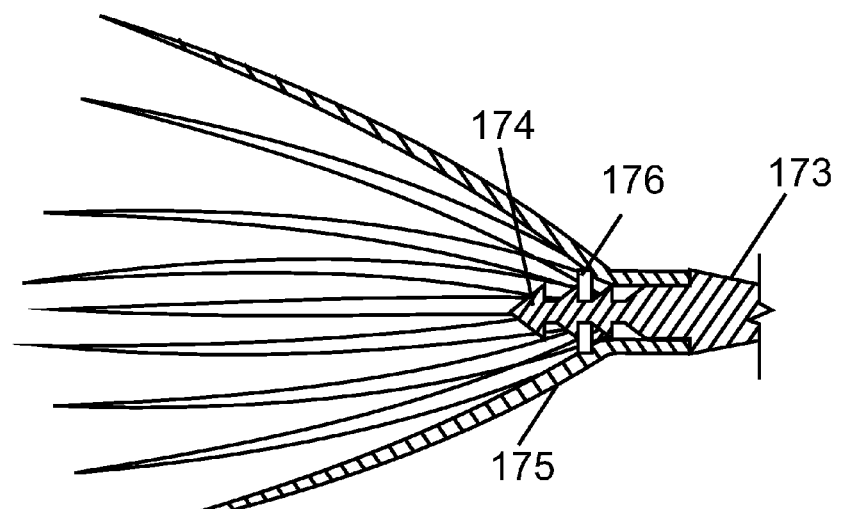
Figure 31B:
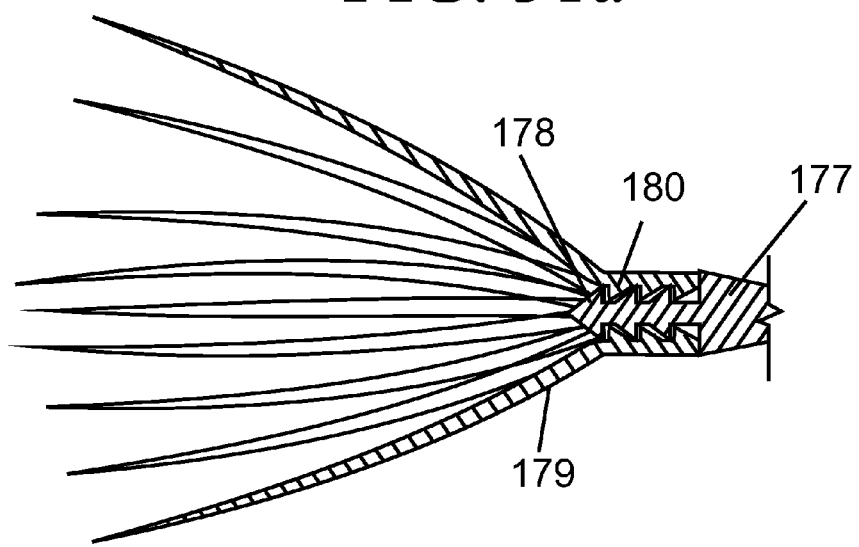

FIG. 31a-b refer to connection methods for attaching an extension to an armature that is connected to a pivot bridge assembly as could occur for the squid bait simulation.

FIG. 31a shows an armature 173 that includes stepped protruding forward projections 174. The tentacle skirt 175 locates over the stepped protruding forward projections 174 via friction and or adhesive engagement. A locking collar 176 can be fitted over the stepped protruding forward projections 174 to locate the tentacle skirt 175 in position.

FIG. 31b shows an armature 177 that includes stepped male protruding forward projections 178. The tentacle skirt 179 includes stepped female projections 180 which engage with the stepped male protruding forward projections 178 when they are fitted via friction and or adhesive engagement.

Figure 32:
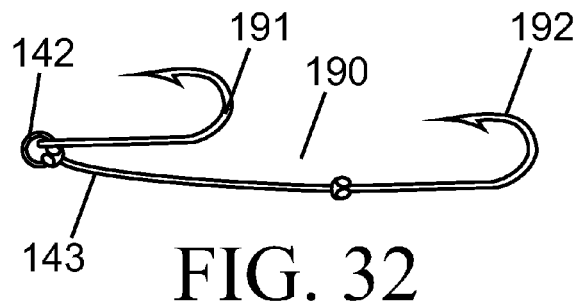
FIG. 32 is a side view of a hook mounting assembly.

FIG. 32 shows a hook mounting assembly 190 that includes a solid ring 142, a front hook 191 and a pre-rigged leader 143 connected to a rear hook 192. The hook mounting assembly allows for a front hook 191 and a rear hook 192 to be mounted on a fishing lure.

The invention claimed is:

1. A fishing lure for attracting fish species, the fishing lure comprising:
 a body;
 a first pivot on the body;
 a second pivot on the body and spaced from the first pivot;
 a bridge between the first pivot and the second pivot, the bridge resiliently deformable from a neutral position to a forward position;
 each pivot element being resiliently deformable from a neutral position to a biased position, and each pivot element extending forward of the bridge when the bridge is in the neutral position;
 a pivot arm extending from the first pivot and operably coupled to the bridge; wherein:
  deformation of the bridge towards the forward position causes the pivot arm to rotate in a first direction and biasing of the pivots and resilient recovery of the bridge towards the neutral position and associated return of the pivots to a neutral position, causes the pivot arm to rotate in a second direction, opposite to the first direction.

2. The fishing lure of claim 1 wherein the body comprises two or more engaged sections.

3. The fishing lure of claim 1 wherein the body is formed to represent a bait species such as a frog, fish, bug, insect, crab, turtle, lizard, fly, cicada, dragonfly, squid, cuttlefish or imaginary creature.

4. The fishing lure of claim 1 wherein the first pivot and second pivot are spaced on opposite sides to a longitudinal axis of the body.

5. The fishing lure of claim 1 wherein the bridge is formed from a resilient elastomeric material and is arched in a curve between the first pivot and second pivot.

6. The fishing lure of claim 1 wherein the lure includes a first pivot arm and a second pivot arm both operably coupled to the bridge and extended beyond the first pivot and second pivot respectively.

7. The fishing lure of claim 1 further including a trigger area on the bridge, the trigger area adapted to receive a force applied directly or indirectly through a fishing line or hook to cause deformation of the bridge from a neutral position.

8. The fishing lure of claim 7 wherein the trigger area is a tunnel placed between the first pivot and second pivot and traversing the bridge from front to back.

9. The fishing lure of claim 4 wherein the first and second pivots are equilaterally spaced on opposition sides of the longitudinal axis.

10. The fishing lure of claim 6 wherein the pivot arms arc formed as appendages of an animal selected from legs, fins, wings, tails, flippers, arms or tentacles.

11. The fishing lure of claim 6 where the pivot arms include interchangeable portions fitted by one or more of frictional attachment, adhesive attachment, clips, bayonet fittings, screws or using stepped protruding forward projections.

12. The fishing lure of claim 1 wherein deformation from a neutral position to forward position has at least some movement outside a place including the first pivot and second pivot.

13. The fishing lure of claim 1 further including one or more hooks.

14. The fishing lure of claim 1 further including a resistance enhancer for increasing resistance to forward movement of the fishing lure through the water.

15. The fishing lure of claim 14 wherein the resistance enhancer is one or more of front legs, a forward body segment, a concave cup, a mouth, a lip or a bib.

16. The fishing lure of claim 1 further including one or more cavities adapted to receive one or more of a weight, a scent pellet, a flotation chamber, or a rattle.

17. The fishing lure of claim 1 further including a separate component for introduction into a forward position of the body, the separate component adapted to vary buoyancy by including one or more of an air pocket, a buoyant material, a chamber or cavity, a slide or rail for insertion of a weight.

18. The fishing lure of claim 1 further including a guard for shielding a gape and point of a hook.

19. The fishing lure of claim 1 further including more than one hook which engages movement in more than one area of the fishing lure.

* * * * *